US012089215B2

(12) United States Patent
Xu et al.

(10) Patent No.: US 12,089,215 B2
(45) Date of Patent: Sep. 10, 2024

(54) PUCCH TRANSMISSION METHOD AND APPARATUS, AND NETWORK DEVICE

(71) Applicant: GUANGDONG OPPO MOBILE TELECOMMUNICATIONS CORP., LTD., Guangdong (CN)

(72) Inventors: Jing Xu, Dongguan (CN); Yanan Lin, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 366 days.

(21) Appl. No.: 17/586,546

(22) Filed: Jan. 27, 2022

(65) Prior Publication Data
US 2022/0150942 A1 May 12, 2022

Related U.S. Application Data

(63) Continuation of application No. PCT/CN2019/098748, filed on Jul. 31, 2019.

(51) Int. Cl.
*H04W 72/21* (2023.01)
*H04W 72/23* (2023.01)

(52) U.S. Cl.
CPC ........... *H04W 72/21* (2023.01); *H04W 72/23* (2023.01)

(58) Field of Classification Search
CPC . H04W 72/21; H04W 72/23; H04W 72/0446; H04L 5/0053; H04L 5/0094
See application file for complete search history.

(56) References Cited

U.S. PATENT DOCUMENTS

| | | | | |
|---|---|---|---|---|
| 2019/0261361 | A1* | 8/2019 | Xiong | H04W 72/02 |
| 2020/0022161 | A1* | 1/2020 | Yang | H04L 5/0057 |
| 2020/0228248 | A1* | 7/2020 | Islam | H04L 1/1861 |
| 2021/0135946 | A1* | 5/2021 | Babaei | H04L 1/1896 |
| 2022/0287010 | A1* | 9/2022 | Chen | H04W 72/02 |

FOREIGN PATENT DOCUMENTS

| | | |
|---|---|---|
| CN | 108632966 A | 10/2018 |
| CN | 109906576 A | 6/2019 |
| CN | 110035535 A | 7/2019 |
| WO | WO 2021/016969 A1 | 2/2021 |

OTHER PUBLICATIONS

The Extended EP Search Report of corresponding European application No. 19939709.2, dated Jun. 20, 2022.
LG Electronics, "Remaining issues on UCI multiplexing", R1-1806623, 3GPP TSG RAN WG1 Meeting #93, Busan, Korea, May 21-25, 2018, all pages.

(Continued)

*Primary Examiner* — Afshawn M Towfighi
(74) *Attorney, Agent, or Firm* — Ladas & Parry, LLP

(57) ABSTRACT

Embodiments of the present application provide a channel transmission method and apparatus, a terminal and a network device, where the method includes: determining, by a terminal, a transmission mode of uplink information of at least two PUCCHs according to time domain position and/or processing time of the at least two PUCCHs under a condition of determining that resources of the at least two PUCCHs have an overlapping part in time domain.

20 Claims, 10 Drawing Sheets

(56) References Cited

OTHER PUBLICATIONS

International Search Report (ISR) dated Apr. 22, 2020 for Application No. PCT/CN2019/098748, and its English Translation provided by WIPO.
Written Opinion dated Apr. 22, 2020 for Application No. PCT/CN2019/098748, and it's English Translation provided by Google Translate.
Zte et al. "URLLC PHY Enhancements" 3GPP TSG RAN WG1 Meeting #94 R1-1808211, Aug. 11, 2018 (Aug. 11, 2018), entire document.

* cited by examiner

Determining, by a the terminal, a transmission mode of uplink information of the at least two PUCCHs according to time domain position and/or processing time of the at least two PUCCHs under the condition of determining that resources of the at least two PUCCHs have overlapping part in time domain ⟵ 401
FIG. 4
FIG. 5-1
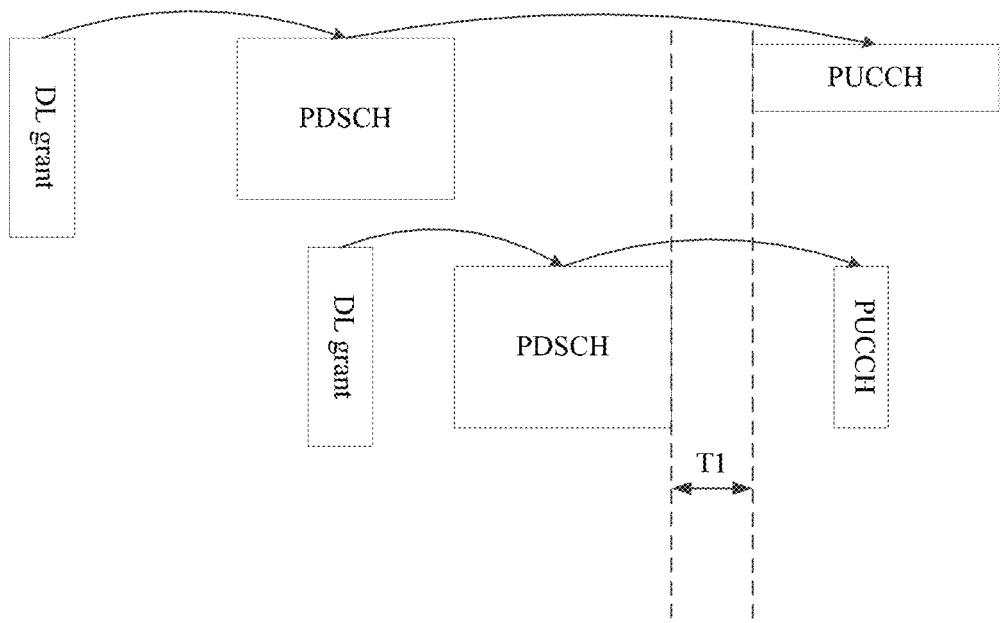
FIG. 5-2

Determining, by a network device, a transmission mode of uplink information of the at least two PUCCHs according to time domain position and/or processing time of the at least two PUCCHs under the condition of determining that resources of the at least two PUCCHs have overlapping part in time domain — 601

PUCCH TRANSMISSION METHOD AND APPARATUS, AND NETWORK DEVICE

CROSS-REFERENCE TO RELATED APPLICATIONS

The present application is a continuation of International Application No. PCT/CN2019/098748, filed on Jul. 31, 2019, entitled "CHANNEL TRANSMISSION METHOD AND APPARATUS, TERMINAL, AND NETWORK DEVICE", the content of which is incorporated herein by reference in its entirety.

TECHNICAL FIELD

Embodiments of the present application relate to the technical field of mobile communication, and in particular to a channel transmission method and apparatus, a terminal, and a network device.

BACKGROUND

At present, there is only one physical uplink control channel (PUCCH) used for hybrid automatic repeat request acknowledgement/negative acknowledgement (HARQ-ACK) (Hereinafter referred to as PUCCH-ACK for short) in a slot, therefore, there would not be multiple PUCCH-ACKs in a slot, and further, there would not be a problem that multiple PUCCH-ACKs overlap in time domain. However, in the ultra reliable low latency (URLLC) enhancement project, there may be multiple PUCCH-ACKs in a slot, and there may be that multiple PUCCH-ACKs overlap in time domain. Therefore, when multiple PUCCH-ACKs overlap in time domain, how to multiplex the multiple PUCCH-ACKs is a problem to be solved.

SUMMARY

Embodiments of the present application provide a channel transmission method and apparatus, a terminal, and a network device.

The channel transmission method provided by an embodiment of the present application includes:

determining, by a terminal, a transmission mode of uplink information of at least two PUCCHs according to time domain position and/or processing time of the at least two PUCCHs under a condition of determining that resources of the at least two PUCCHs have an overlapping part in time domain.

The channel transmission method provided by an embodiment of the present application includes:

determining, by a network device, a transmission mode of uplink information of at least two PUCCHs according to time domain position and/or processing time of the at least two PUCCHs under a condition of determining that resources of the at least two PUCCHs have an overlapping part in time domain.

The channel transmission apparatus provided by an embodiment of the present application is applied to a terminal, where the apparatus includes:

a determining unit, configured to determine a transmission mode of uplink information of at least two PUCCHs according to time domain position and/or processing time of the at least two PUCCHs under a condition of determining that resources of the at least two PUCCHs have an overlapping part in time domain.

The channel transmission apparatus provided by an embodiment of the present application is applied to a network device, where the apparatus includes:

a determining unit, configured to determine a transmission mode of uplink information of at least two PUCCHs according to time domain position and/or processing time of the at least two PUCCHs under a condition of determining that resources of the at least two PUCCHs have an overlapping part in time domain.

The terminal provided by an embodiment of the present application includes a processor and a memory. The memory is configured to store a computer program, and the processor is configured to call and run the computer program stored in the memory to execute the above-mentioned channel transmission method.

The network device provided by an embodiment of the present application includes a processor and a memory. The memory is configured to store a computer program, and the processor is configured to call and run the computer program stored in the memory to execute the above-mentioned channel transmission method.

The chip provided by an embodiment of the present application is configured to implement the above-mentioned channel transmission methods.

Specifically, the chip includes a processor configured to call and run a computer program from the memory, causing a device on which the chip is installed to execute the above-mentioned channel transmission methods.

The computer-readable storage medium provided by an embodiment of the present application is configured to store a computer program that causes a computer to execute the above-mentioned channel transmission methods.

The computer program product provided by an embodiment of the present application includes computer program instructions that cause a computer to execute the above-mentioned channel transmission methods.

The computer program provided by an embodiment of the present application, when run on a computer, causes a computer to execute the above-mentioned channel transmission methods.

The above-mentioned technical solutions of the embodiments of the present application determine a transmission mode (e.g., a multiplexing transmission mode) of uplink information of at least two PUCCHs according to time domain position and/or processing time of the at least two PUCCHs (e.g., PUCCH-ACK) under a condition of determining that resources of the at least two PUCCHs have an overlapping part in time domain. The technical solutions of the embodiments of the present application can not only guarantee to be realized by the terminal, but also avoid that additional delay of the multiplexing channel transmission corresponding to the at least two PUCCHs cannot meet the delay requirement, and furthermore, the refined time sequence calculation mode can further improve the multiplexing efficiency, thereby improving the system transmission efficiency.

BRIEF DESCRIPTION OF THE DRAWINGS

The drawings described herein are used to provide a further understanding of the present application and constitute a part of the present application. The illustrative embodiments and descriptions thereof of the present application are used to explain the present application, but do not constitute improper limitations of the present application. In the drawings:

FIG. 2-1 is a schematic diagram of the time sequence relationship of the multiplexing between PUCCH and PUCCH provided by an embodiment of the present application;

FIG. 2-2 is a first schematic diagram of a HARQ-ACK codebook provided by an embodiment of the present application;

FIG. 2-3 is a second schematic diagram of a HARQ-ACK codebook provided by an embodiment of the present application;

FIG. 2-4 is a schematic diagram of PUCCH multiplexing delay provided by an embodiment of the present application;

FIG. 3 is a system flow chart provided by an embodiment of the present application;

FIG. 4 is a first flow schematic diagram of a method for determining a transmission mode provided by an embodiment of the present application;

FIG. 5-1 is a schematic diagram of PUCCH and PUCCH overlapping in time domain provided by an embodiment of the present application;

FIG. 5-2 is a first schematic diagram of time sequence requirements provided by an embodiment of the present application;

FIG. 5-3 is a second schematic diagram of time sequence requirements provided by an embodiment of the present application;

FIG. 5-4 is a third schematic diagram of time sequence requirements provided by an embodiment of the present application;

FIG. 5-5 is a third schematic diagram of a HARQ-ACK codebook provided by an embodiment of the present application;

FIG. 5-6 is a flow schematic diagram of determining multiplexing PUCCH resources provided by an embodiment of the present application;

FIG. 5-7 is a fourth schematic diagram of a HARQ-ACK codebook provided by an embodiment of the present application;

FIG. 5-8 is a fifth schematic diagram of a HARQ-ACK codebook provided by an embodiment of the present application;

FIG. 5-9 is a sixth schematic diagram of a HARQ-ACK codebook provided by an embodiment of the present application;

FIG. 6 is a second flow schematic diagram of the method for determining a transmission mode provided by an embodiment of the present application;

FIG. 7 is a first schematic diagram of the structural composition of a channel transmission apparatus provided by an embodiment of the present application;

FIG. 8 is a second schematic diagram of the structural composition of a channel transmission apparatus provided by an embodiment of the present application;

FIG. 9 is a schematic structural diagram of a communication device provided by an embodiment of the present application;

DESCRIPTION OF EMBODIMENTS

The technical solutions in the embodiments of the present application are described below with reference to the accompanying drawings of the embodiments of the present application. Obviously, the described embodiments are part of the embodiments of the present application, rather than all of the embodiments. Based on the embodiments in the present application, all other embodiments obtained by those of ordinary skill in the art without paying creative labor belong to the protection scope of the present application.

The technical solutions of the embodiments of the present application can be applied to various communication systems, such as long term evolution (LTE) system, LTE frequency division duplex (FDD) system, LTE time division duplex (TDD) system, 5G communication system or future communications system, etc.

Figure 1:
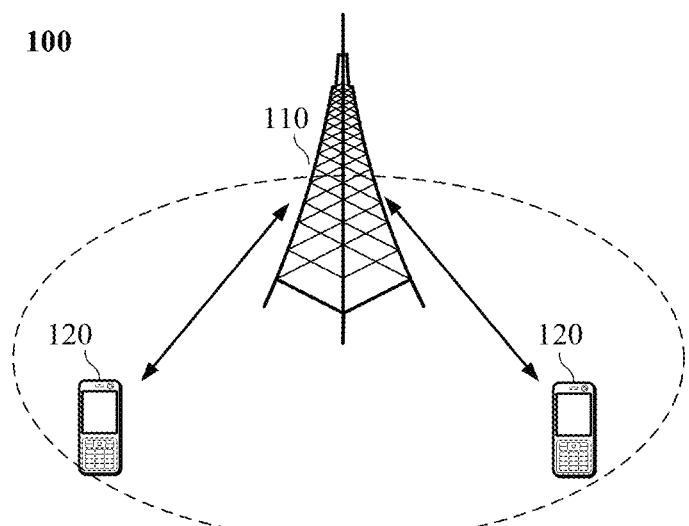
FIG. 1 is a schematic diagram of a communication system architecture provided by an embodiment of the present application.

Illustratively, a communication system 100 applied in an embodiment of the present application is shown in FIG. 1. The communication system 100 may include a network device 110, which may be a device that communicates with terminals 120 (or called communication terminals or terminals). The network device 110 can provide communication coverage for a specific geographical area, and can communicate with terminals located in the coverage area. In an embodiment, the network device 110 may be an evolved base station (Evolutional Node B, eNB or eNodeB) in an LTE system, or a wireless controller in a cloud radio access network (CRAN). Or the network device can be a mobile switching center, relay station, access point, vehicle-mounted device, wearable device, hub, switch, bridge, router, network side device in 5G network or network device in the future communication system, etc.

The communication system 100 also includes at least one terminal 120 located within the coverage area of the network device 110. As used herein, a "terminal" includes but is not limited to devices connected via wired lines, such as connected via public switched telephone networks (PSTN), digital subscriber line (DSL), digital cable and direct cable; and/or another data connection/network; and/or via a wireless interface, such as a cellular network, a wireless local area network (WLAN), a digital television network such as a DVB-H network, a satellite network, an AM-FM broadcast transmitter; and/or an apparatus of another terminal arranged to receive/send communication signals; and/or Internet of Things (IoT) device. A terminal arranged to communicate through a wireless interface may be referred to as a "wireless communication terminal", a "wireless terminal" or a "mobile terminal". Examples of mobile terminals include but are not limited to satellite or cellular phones; personal communications system (PCS) terminal which can combine cellular radio telephone with data processing, fax and data communication capabilities; PDA that may include radio telephones, beeper, internet/intranet access, Web browsers, notebooks, calendars, and/or global positioning system (GPS) receivers; and conventional laptop and/or palmtop receivers or other electronic devices including radio telephone transceivers. Terminals may refer to access terminals, user equipments (UE), user units, user stations, mobile stations, mobile platforms, remote stations, remote terminals, mobile devices, user terminals, terminals, wireless communication devices, user agents or user apparatuses. Access terminals may be cellular phones, cordless phones, session initiation protocol (SIP) phones, wireless local loop (WLL) stations, personal digital assistant (PDA), handheld devices with wireless communication functions, computing devices or other processing devices connected to wireless modems, vehicle-mounted devices, wearable devices, terminals in 5G network or terminals in future evolved PLMN, etc.

In an embodiment, device to device (D2D) communication can be performed between terminals 120.

In an embodiment, the 5G communication system or 5G network can also be called a New Radio (NR) system or NR network.

FIG. 1 exemplarily shows one network device and two terminals. In an embodiment, the communication system 100 may include multiple network devices and other numbers of terminals may be included in the coverage area of each network device, which is not limited by the embodiments of the present application.

In an embodiment, the communication system 100 may also include other network entities such as a network controller, a mobility management entity, etc., which are not limited by embodiments of the present application.

It should be understood that devices with communication functions in the network/system in the embodiments of the present application can be called communication devices. Taking the communication system 100 shown in FIG. 1 as an example, the communication devices may include a network device 110 and terminals 120 with communication functions, and the network device 110 and the terminals 120 may be the specific devices described above, which will not be repeated herein. Communication devices may also include other devices in the communication system 100, such as network controllers, mobility management entities and other network entities, which are not limited in the embodiments of the present application.

It should be understood that the terms "system" and "network" herein are often used interchangeably herein. The term "and/or" herein, which is only an association relation describing the associated objects, indicates that there can be three kinds of relationships, for example, A and/or B, which can indicate that A exists alone, A and B exist at the same time, and B exists alone. In addition, the character "/" herein generally indicates that the context object is an "or" relationship.

In order to facilitate the understanding of the technical solutions of the embodiments of the present application, the related technical solutions of the embodiments of the present application will be described below.

Multiplex transmission between PUCCH and PUCCH

In the first version of NR, in order to reduce the intermodulation interference of UE uplink transmission, when the transmission between PUCCH and PUCCH overlap in the time domain, the following two transmission modes are supported: 1) only one PUCCH transmission is reserved, or 2) uplink control information (UCI) in two PUCCHs is multiplexed for transmission on the new PUCCH. Note: there can be multiple PUCCHs in a slot, but there is at most one PUCCH for HARQ-ACK feedback.

In NR, the flexibility of PUCCH structural design leads their starting symbol and ending symbol to be not necessarily aligned. In order to ensure that the UE has enough processing time to multiplex the data information in the UCI information domain, PUCCH and PUCCH therebetween must meet the fixed time sequence requirements so as to multiplex transmission, otherwise, the UE will reserve one PUCCH transmission.

Figures 1, 2:
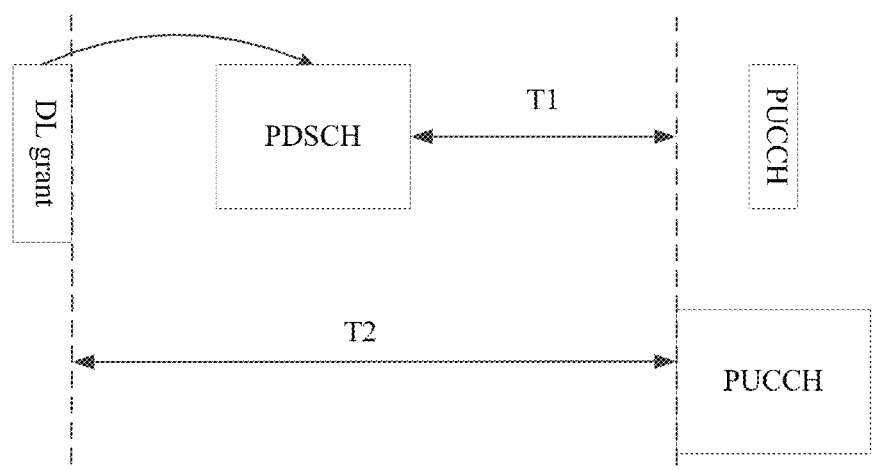
Figure 2:
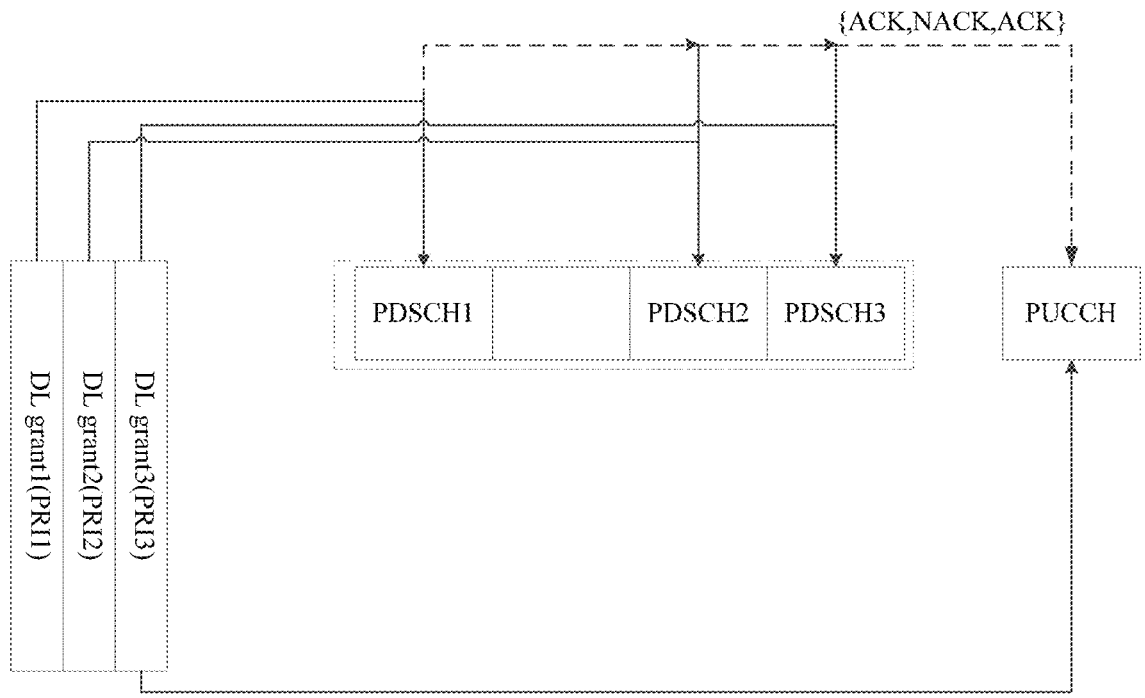

(1) Time Sequence Requirements for Multiplexing Between PUCCH and PUCCH 1) the time difference (T1 as shown in FIG. 2-1) from the first orthogonal frequency division multiplexing (OFDM) symbol of the earliest sent channel of PUCCH overlapped in time domain to the last OFDM symbol of the physical downlink shared channel (PDSCH) scheduled by downlink control information (DCI) scheduling HARQ-ACK is longer than $N_1+d_{1,1}+d_{1,2}+1$ OFDM symbols, where the meanings of various parameters are as follows:

$N_1$: $N_1$ is related to the ability of the UE to process PDSCH reported by the UE.

$d_{1,1}$: I) If HARQ-ACK is carried on PUCCH, $d_{1,1}=0$;
II) if HARQ-ACK is carried on PUSCH, $d_{1,1}=1$.

$d_{1,2}$: I) if it is PDSCH mapping type, Type A, if the last symbol of PDSCH is symbol i, and i<7, then $d_{1,2}=7-i$.

II) if it is PDSCH mapping type, Type B,

For UE processing capacity 1, if the PDSCH symbol length is 4, then $d_{1,2}=3$; if the PDSCH symbol length is 2, then $d_{1,2}=3+d$, where d is a number of symbols overlapped by scheduling PDSCH corresponding to PDCCH.

A For UE processing capacity 2, $d_{1,2}$ is a number of symbols overlapped by scheduling PDSCH corresponding to PDCCH.

2) the time difference (T2 as shown in FIG. 2-1) from the first OFDM symbol of the earliest sent channel of PUCCH overlapping in time domain to the last OFDM symbol of DCI scheduling HARQ-ACK is larger than $N_2+d_{2,1}+1$ OFDM symbols, where the meanings of various parameters are as follows:

$N_2$: $N_2$ is the time of the UE to prepare PUSCH reported by UE.

$d_{2,1}$: if the first PUSCH contains a demodulation reference signal (DMRS), then $d_{2,1}=0$; otherwise, $d_{2,1}=1$.

HARQ-ACK codebook (HARQ-ACK multiplexing feedback)

Since the independent feedback of each HARQ-ACK will reduce the transmission efficiency of HARQ-ACK, NR introduces the HARQ-ACK codebook, i.e., multiple HARQ-ACKs as a whole feedback, as shown in FIG. 2-2.

HARQ-ACK transmission resources (PUCCH-ACK) are determined by PUCCH resource indicator (PRI) in downlink grant (DL grant) signaling corresponding to the last feedback information in HARQ-ACK codebook, or are determined according to ACK/NACK resource indicator (ARI) in DL Grant corresponding to the last feedback information in HARQ-ACK codebook and CCE index of PDCCH jointly, as shown in FIG. 2-2. If there is no transmission scheduled by DL Grant in the PDSCH set corresponding to the HARQ-ACK codebook, that is, only semi-persistent scheduling (SPS) transmission is included, then the codebook is transmitted by the PUCCH resources configured for SPS, as shown in FIG. 2-3.

In the above-mentioned solution, there is only one PUCCH for transmitting HARQ-ACK in a slot (hereinafter referred to as PUCCH-ACK, and PUCCH-ACK is only a simple identifier), therefore, there would be no multiple PUCCH-ACKs in a slot, and further, there would not be a problem that multiple PUCCH-ACKs overlap in time domain therebetween. However, in the URLLC enhancement project, there may be PUCCH-ACKs in a slot, and there may be that multiple PUCCH-ACKs overlap in time domain therebetween. Therefore, when multiple PUCCH-ACKs overlap in time domain, how to multiplex is a problem to be solved. If the method according to multiplexing PUCCH of multiple types of UCI (hereinafter referred to as PUCCH-UCI) is directly referred to, since the multiplexing conditions of PUCCH-UCI only consider whether the time sequence requirements are met, and the delay problem after multiplexing is not considered, the time domain ending position of the multiplexing PUCCH-UCI will be later than the time domain ending position of the original PUCCH- UCI, resulting in an increase of UCI transmission delay in the original PUCCH-UCI, as shown in FIG. 2-4. For low latency services such as URLLC, the increased transmission delay may affect its transmission efficiency or directly fail to meet the delay demand of services. In addition, the PUCCH-ACK resource is determined according to the PUCCH resource indicator of the DL Grant corresponding to the last feedback information in the HARQ-ACK codebook. There is no solution for determining PUCCH-ACK resources when two HARQ-ACK codebooks (such as URLLC HARQ-ACK codebook and eMBB HARQ-ACK codebook) are multiplexed. In addition, considering the low latency service, the processing time is extremely short, and the current rough and conservative time sequence calculation method (the reference point of time sequence calculation is "last" and "first", which does not match the actual transmission situation) may lead to inefficient transmission, that is, the situation that can perform multiplexing method also adopt the method of discarding transmission, therefore, the time sequence calculation method needs to be optimized. Therefore, the following technical solutions of the embodiments of the present application are proposed.

Figures 2, 3:
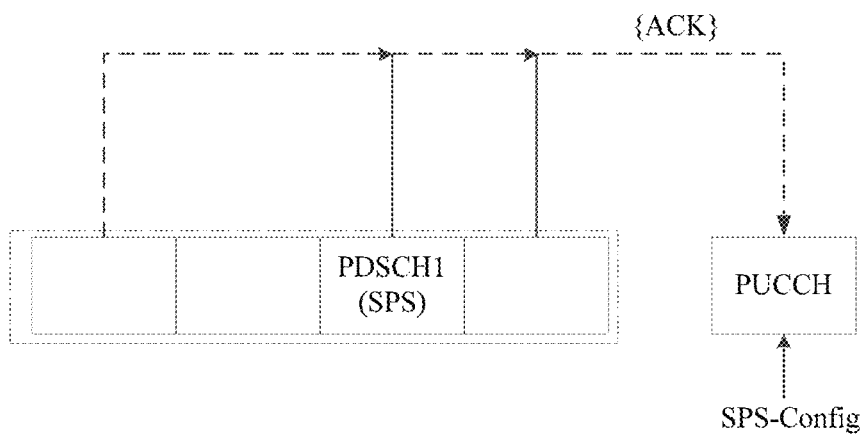
Figures 2, 3, 4:
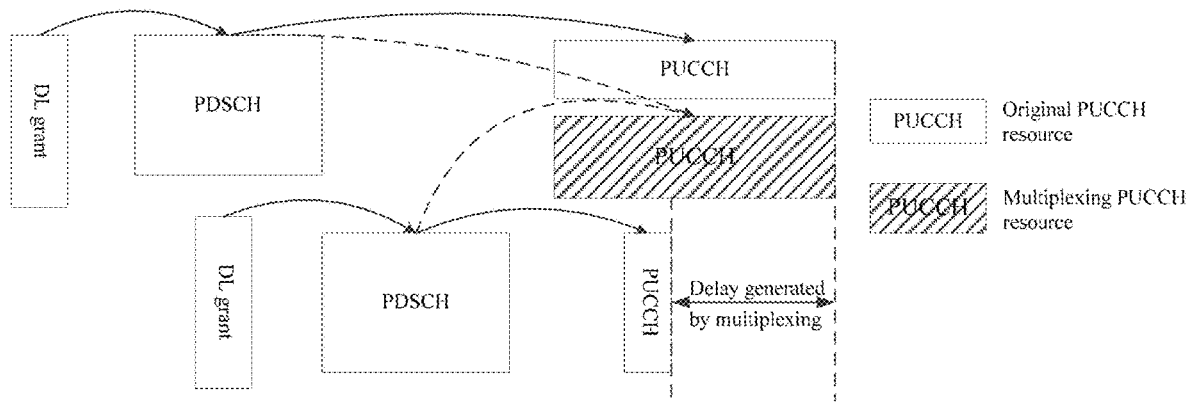
Figure 3:
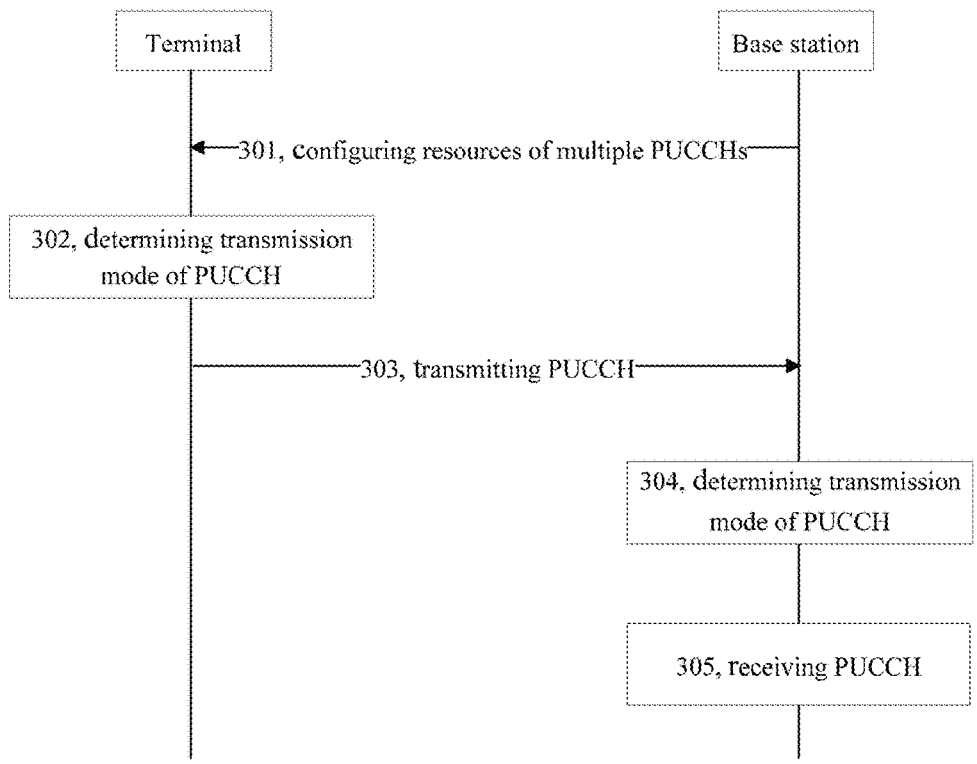

FIG. 3 is a system flow chart provided by an embodiment of the present application, as shown in FIG. 3, which includes the following steps:

step 301: configuring, by a base station, resources of multiple PUCCHs for a terminal.

In an implementation, the PUCCH refers to PUCCH-ACK, that is, the PUCCH is used for transmitting HARQ-ACK feedback information, and in particular, the PUCCH is used for transmitting a HARQ-ACK codebook, herein, the HARQ-ACK codebook includes HARQ-ACK feedback information corresponding to at least one PUSCH. It should be noted that the HARQ-ACK feedback information in an embodiment of the present application refers to acknowledgement (ACK) feedback information or negative acknowledgement (NACK) feedback information.

In an example, the base station configures resources of multiple PUCCH-ACKs for the terminal.

Step 302: determining, by the terminal, a transmission mode of PUCCH.

In an example, the terminal determines a transmission mode of PUCCH-ACK.

Step 303: sending, by the terminal, PUCCH according to the determined transmission mode.

In an example, the terminal sends PUCCH-ACK according to the determined transmission mode.

Step 304: determining, by the base station, a transmission mode of PUCCH.

In an example, the base station determines a transmission mode of PUCCH-ACK.

Step 305: receiving, by the base station, PUCCH according to the determined transmission mode.

In an example, the base station receives PUCCH-ACK according to the determined transmission mode.

It should be noted that "determining a transmission mode of PUCCH" on the base station side is implemented inside the base station, and the sequence relationship with other steps is not limited, and only one implementation is given in FIG. 3. The steps (step 302 and step 304) of "determining a transmission mode of PUCCH" in FIG. 3 can be realized by the following technical solutions of embodiments of the present application.

FIG. 4 is a first flow diagram of a method for determining a transmission mode provided by an embodiment of the present application, as shown in FIG. 4, the method for determining the transmission mode includes the following steps:

step 401: determining, by a terminal, a transmission mode of uplink information of at least two PUCCHs according to time domain position and/or processing time of the at least two PUCCHs under a condition of determining that resources of the at least two PUCCHs have an overlapping part in time domain.

In an implementation of the present application, the PUCCH refers to PUCCH-ACK, that is, the PUCCH is used for transmitting HARQ-ACK feedback information, and in particular, the PUCCH is used for transmitting a HARQ-ACK codebook, herein, the HARQ-ACK codebook includes HARQ-ACK feedback information corresponding to at least one PUSCH. It should be noted that the HARQ-ACK feedback information in an embodiment of the present application refers to acknowledgement ACK feedback information or NACK feedback information.

Figures 3, 5:
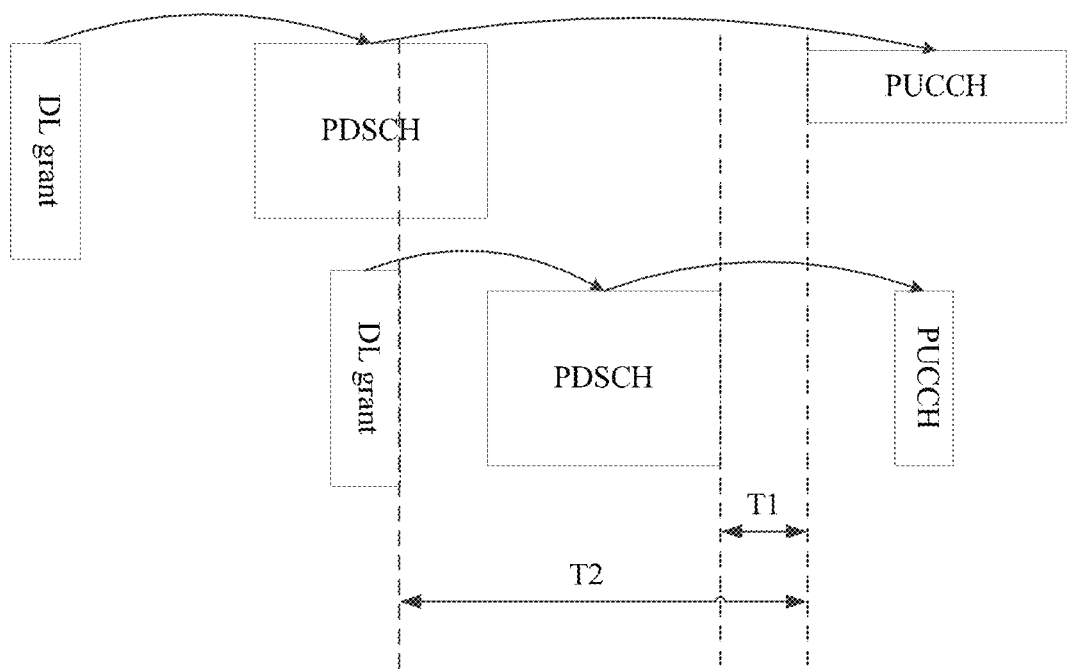
Figures 4, 5:
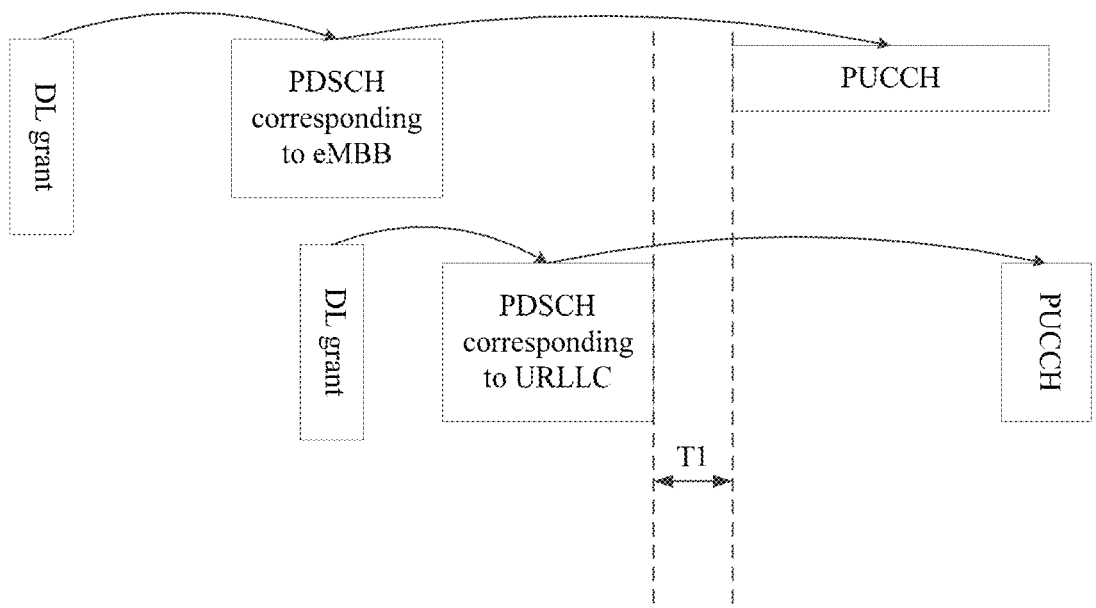
Figure 5:
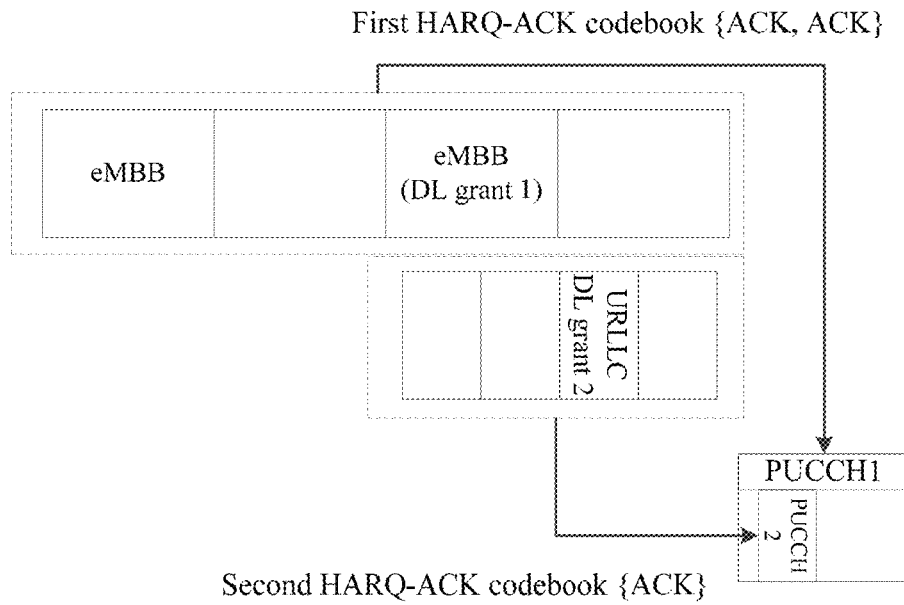

In an embodiment of the present application, the terminal determines that resources of at least two PUCCHs have the overlapping part in time domain. For example, referring to FIG. 5-1, the resources of PUCCH-ACK 1 and PUCCH-ACK 2 have the overlapping part in time domain, where the overlapping mode can be total overlapping or partial overlapping. Further, the partial overlapping mode can be divided into inclusive mode overlapping or non-inclusive mode overlapping. FIG. 5-1 is inclusive mode overlapping, that is, PUCCH-ACK 1 contains the time domain resource of PUCCH-ACK 2.

In an implementation of the present application, the resources of the at least two PUCCHs can be determined through dynamic signaling, or semi-persistent signaling, or one part is determined through dynamic signaling and the other part is determined through semi-persistent signaling. For example, the terminal receives a DL Grant sent by a network device, and the DL Grant is used for scheduling PDSCH, and the DL Grant carries an indicator for indicating HARQ-ACK feedback resource (i.e., PUCCH resource) for the PDSCH, and the terminal determines PUCCH resource based on the DL Grant. For another example, the terminal receives semi-persistent signaling (such as n1PUCCH-AN in SPS-Config) sent by the network device, and determines PUCCH resource through the semi-persistent signaling.

In an embodiment of the present application, the terminal determines a transmission mode of uplink information of the at least two PUCCHs according to time domain position and/or processing time of the at least two PUCCHs under a condition of determining that resources of the at least two PUCCHs have an overlapping part in time domain. How to determine the transmission mode will be described separately in combination with the time domain position and processing time.

The terminal determines a transmission mode of uplink information of the at least two PUCCHs according to time domain positions of the at least two PUCCHs Further, in an embodiment, the terminal determines a transmission mode of uplink information of the at least two PUCCHs according to time domain ending positions of the at least two PUCCHs in time domain. In this way, it can be avoided that the time domain ending position of the multiplexing channel is later than the time domain ending position of the first type of PUCCH, thereby avoiding the additional delay of HARQ-ACK feedback caused by the multiplexing channel. In an example, the multiplexing channel is a multiplexing PUCCH, and the multiplexing channel (i.e., the multiplexing PUCCH) is used for transmitting uplink information in the at least two PUCCHs, herein, the uplink information is, for example, HARQ-ACK feedback information.

Further, in an embodiment, the at least two PUCCHs include a first type of PUCCH and a second type of PUCCH; the terminal determines that uplink information of the at least two PUCCHs adopts a multiplexing transmission mode if a time domain ending position of the first type of PUCCH is in the back of or the same as a time domain ending position of the second type of PUCCH.

Specifically, if the time domain ending position of the first type of PUCCH is not in the front of the time domain ending position of the second type of PUCCH, then the at least two PUCCHs are multiplexed for transmission. In this way, it can basically avoid that the time domain ending position of the multiplexing PUCCH is later than the time domain ending position of the first type of PUCCH, and therefore will not bring additional delay of HARQ-ACK feedback. In addition, the solution adopts the resource of the original PUCCH as the judging condition, which is relatively direct.

Further, in an embodiment, the terminal receives first configuration information sent by a network device, where the first configuration information is used for determining a candidate PUCCH set, and a time domain ending position of any candidate PUCCH in the candidate PUCCH set is in the front of or the same as the time domain ending position of the first type of PUCCH; where the second type of PUCCH belongs to the candidate PUCCH set. Herein, constraining the time domain ending position of any PUCCH-ACK of the candidate PUCCH set not being in the back of the time domain ending position of the first type of PUCCH, it can be ensured that the multiplexing PUCCH is not in the back of the first type of PUCCH.

Further, in an embodiment, the terminal determines that only uplink information of the first type of PUCCH in the at least two PUCCHs is transmitted, or the terminal determines that only uplink information of the first type of PUCCH in the at least two PUCCHs is transmitted in the overlapping part if the time domain ending position of the first type of PUCCH is in the front of the time domain ending position of the second type of PUCCH (In an embodiment, the uplink information of the at least two PUCCHs is independently transmitted in the non-overlapping part).

Herein, in an embodiment, the first type of PUCCH is a PUCCH with a low latency requirement.

Further, in an embodiment, the at least two PUCCHs include a first type of PUCCH and a second type of PUCCH; the terminal determines that uplink information of the at least two PUCCHs adopts a multiplexing transmission mode if a time domain ending position of the first type of PUCCH is in the back of or the same as a time domain ending position of a multiplexing channel; where the multiplexing channel is used for transmitting uplink information in the at least two PUCCHs.

Herein, the multiplexing channel is, for example, a multiplexing PUCCH, which is used for transmitting uplink information in the at least two PUCCHs, and herein, the uplink information is, for example, HARQ-ACK feedback information. Specifically, the time domain ending position of the first type of PUCCH is not in the front of the time domain ending position of the multiplexing PUCCH, then at least two PUCCHs are multiplexed for transmission. In this way, it can completely avoid that the time domain ending position of the multiplexing PUCCH is later than the time domain ending position of the first type of PUCCH, and therefore will not bring additional delay of HARQ-ACK feedback.

Further, in an embodiment, the terminal determines that only uplink information of the first type of PUCCH in the at least two PUCCHs is transmitted, or the terminal determines that only the uplink information of the first type of PUCCH in the at least two PUCCHs is transmitted in the overlapping part if the time domain ending position of the first type of PUCCH is in the front of the time domain ending position of the multiplexing channel (In an embodiment, the uplink information of the at least two PUCCHs is independently transmitted in the non-overlapping part).

Herein, in an embodiment, the first type of PUCCH is a PUCCH with a low latency requirement.

In an embodiment of the present application, the terminal determines the first type of PUCCH and the second type of PUCCH based on at least one of the following:
service type corresponding to PUCCH;
delay requirement corresponding to PUCCH;
indicator carried in configuration information of physical downlink shared channel (PDSCH) corresponding to PUCCH;
resource configuration information corresponding to PUCCH.

For example, the first type of PUCCH corresponds to the ultra reliable low latency communication (URLLC) service, and the second type of PUCCH-ACK corresponds to the enhance mobile broadband (eMBB) service.

For example, the first type of PUCCH corresponds to low latency service, and the second type of PUCCH corresponds to medium high latency service.

For example, the DL Grant (including explicit and implicit modes) or RRC configuration (mostly used for semi-persistent transmission) based on the PDSCH corresponding to the PUCCH indicates the first type of PUCCH and the second type of PUCCH.

For example, the first type of PUCCH and the second type of PUCCH are determined based on resource configuration information corresponding to PUCCH, where the resource configuration information includes at least one of the following: HARQ-ACK timing granularity, HARQ-ACK multiplexing window, PUCCH resource set, and HARQ-ACK codebook type. For example, the HARQ-ACK timing granularity of the first type of PUCCH is subslot, and the HARQ-ACK timing granularity of the second type of PUCCH is slot. For example, the HARQ-ACK multiplexing window of the first type of PUCCH is a subslot, and the multiplexing window of the second type of PUCCH is a slot. For example, the PUCCH resource set of the first type of PUCCH is configured for low latency, and the PUCCH resource set of the second type of PUCCH is configured for medium high latency. For example, the HARQ-ACK codebook of the first type of PUCCH is configured for low latency, and the HARQ-ACK codebook of the second type of PUCCH is configured for medium high latency.

In the above-mentioned solution, the granularity of judging the ending position in time domain can be symbol level or subslot (consisting of n symbols). Taking subslot as an example, as long as the subslot where the time domain ending position of the first type of PUCCH is located is not in the front of the subslot where the time domain ending position of the second type of PUCCH is located or the subslot where the time domain ending position of the multiplexing PUCCH is located, it is considered that the multiplexing condition is satisfied, and it is unnecessary to consider the sequence of the time domain ending positions of these PUCCHs in the same subslot.

The terminal determines a transmission mode of uplink information of the at least two PUCCHs according to processing time of the at least two PUCCHs Herein, the terminal determines the transmission mode of uplink information of the at least two PUCCHs according to processing time of the at least two PUCCHs, so as to enable to ensure that the terminal has enough time to generate PUCCHs.

Further, in an embodiment, the terminal determines that the uplink information of the at least two PUCCHs adopts a multiplexing transmission mode if a time difference from a starting position of a target PUCCH to a time domain ending position of a target PDSCH is greater than or equal to a first time interval; where the first time interval at least includes a first time, and the first time is processing time of the terminal for PDSCH; the target PUCCH is one of the at least two PUCCHs or a multiplexing PUCCH, and the target PDSCH is one of at least two PDSCHs corresponding to the at least two PUCCHs; where the multiplexing PUCCH is used for transmitting uplink information in the at least two PUCCHs.

In an example, the target PUCCH is the earliest transmitted PUCCH in the at least two PUCCHs.

In an example, the target PUCCH is a multiplexing PUCCH, which is used for transmitting uplink information in the at least two PUCCHs, herein, the uplink information is, for example, HARQ-ACK feedback information.

In an example, the target PDSCH is the last PDSCH of at least two PDSCH corresponding to the at least two PUCCHs.

Specifically, referring to FIG. 5-2, the first time interval is T1, and T1 meets the time sequence requirements of $T1 \geq N_1 + d_{1,1} + d_{1,2} + 1$ OFDM symbols, where N1 (i.e., the first time) is related to the processing capability of the terminal on PDSCH.

In the present embodiment, since there is no PUSCH generation process in the PUCCH multiplexing scenario, there is no need to consider the time sequence requirements of T2. In this way, the complexity of terminal judgment can be reduced, and thus multiplexing efficiency can be improved.

Further, in an embodiment, the terminal determines that the uplink information of the at least two PUCCHs adopts a multiplexing transmission mode if a time difference from the starting position of target PUCCH to the time domain ending position of target PDSCH is greater than or equal to a first time interval, and a time difference from the starting position of the target PUCCH to a time domain ending position of target downlink control information (DCI) is greater than or equal to a second time interval; where the second time interval at least includes a second time, and the second time is preparation time of the terminal for PUSCH; the target DCI is a DCI for scheduling the target PDSCH.

Specifically, referring to FIG. 5-3, the first time interval is T1, and T1 meets the time sequence requirements of $T1 \geq N_1 + d_{1,1} + d_{1,2} + 1$ OFDM symbols, where $N_1$ (i.e., the first time) is related to the processing capability of the terminal on PDSCH. The second time interval is T2, and T2 satisfies the time domain requirement of $T2 \geq N_2 + d_{2,1} + 1$ OFDM symbols, where $N_2$ (i.e., second time) is related to the preparation ability of the terminal on PUSCH.

In the present embodiment, there are few changes to the existing protocol, and the implementation is simple without increasing the complexity of standardization and terminal implementation.

It should be noted that the technical solution of the embodiment of the present application is not limited to the above time sequence requirements, and may have time sequence requirements in other ways.

In the above-mentioned solution, the unit of the time domain position is symbol or sub slot.

It should be noted that in the above embodiments, the time-domain location and processing time are taken as separate examples for description. In a specific implementation, the transmission mode can also be determined by considering the time-domain location and processing time comprehensively.

In an embodiment of the present application, the at least two PUCCHs at least includes a first PUCCH and a second PUCCH, where the first PUCCH is used for transmitting first UCI, and uplink information of the second PUCCH is second UCI; the terminal transmits the first UCI and the second UCI through a multiplexing channel under a condition of determining that the uplink information of the first PUCCH and the uplink information of the second PUCCH adopt a multiplexing transmission mode. Further, in an embodiment, when the terminal determines that the first PUCCH and the second PUCCH cannot adopt the multiplexing transmission mode, only the first type of PUCCH (e.g., low latency PUCCH) is transmitted, or only the first type of PUCCH (e.g., low latency PUCCH) is transmitted in the overlapping part, and each PUCCH is independently transmitted in the non-overlapping part.

It should be noted that the above-mentioned first PUCCH and second PUCCH are only used for distinguishing two different PUCCHs, and the types of the first PUCCH and second PUCCH are not limited. For example, the first PUCCH and the second PUCCH belong to the first type of PUCCH, may all belong to the second type of PUCCH, or the first PUCCH belongs to the first type of PUCCH, and the second PUCCH belongs to the second type of PUCCH.

Specifically, referring to FIG. 5-4, the terminal determines resources of two PUCCH, which correspond to the transmission of eMBB service and URLLC service respectively. The terminal selects the ending symbol of the last PDSCH as the starting point and the beginning symbol of the foremost PUCCH as the ending point, calculates the interval T1 between them and compares it with $N_1 + d_{1,1} + d_{1,2} + 1$. Further, the terminal compares the time domain ending position of PUCCH corresponding to URLLC with the time domain ending position of PUCCH corresponding to eMBB. When $T1 \geq N_1 + d_{1,1} + d_{1,2} = 1$, and the time domain ending position of the PUCCH corresponding to URLLC is in the back of the time domain ending position of the PUCCH corresponding to eMBB, UCI in the two PUCCHs is transmitted through the multiplexing PUCCH. Otherwise, only PUCCH corresponding to URLLC is transmitted.

In an implementation of the present application, the at least two PUCCHs at least include a first PUCCH and a second PUCCH, where uplink information of the first PUCCH is a first feedback codebook and uplink information of the second PUCCH is a second feedback codebook; the terminal transmits the first feedback codebook and the second feedback codebook through a multiplexing channel under a condition of determining that the uplink information of the first PUCCH and the uplink information of the second PUCCH adopt a multiplexing transmission mode.

Further, in an embodiment, resources of the first PUCCH and the second PUCCH may be determined by DL Grant and/or semi-persistent signaling.

1) Resource Determination Mode of the First PUCCH

Mode 1: a resource of the first PUCCH is determined based on a first indicator in a first DCI, where the first indicator is used for indicating the resource of the first PUCCH; where the first feedback codebook is used for transmitting feedback information corresponding to first PDSCH set; resources of the first PDSCH set are scheduled by at least one DCI, and the first DCI refers to the last DCI in the at least one DCI.

Mode 2: a resource of the first PUCCH is determined based on a second indicator in semi-persistent signaling, where the second indicator is used for indicating the resource of the first PUCCH; where the first feedback codebook is used for transmitting feedback information corresponding to first PDSCH set; the resources of the first PDSCH set are all configured by semi-persistent signaling.

2) Resource Determination Mode of the Second PUCCH

Mode 1: a resource of the second PUCCH is determined based on a first indicator in a second DCI, where the first indicator is used for indicating the resource of the second PUCCH; where the second feedback codebook is used for transmitting feedback information corresponding to a second PDSCH set; resources of the second PDSCH set are scheduled by at least one DCI, and the second DCI refers to last DCI in the at least one DCI.

Mode 2: a resource of the second PUCCH is determined based on a second indicator in semi-persistent signaling, where the second indicator is used for indicating the resource of the second PUCCH; where the second feedback codebook is used for transmitting feedback information corresponding to a second PDSCH set; the resources of the second PDSCH set are all configured by semi-persistent signaling.

Specifically, as shown in FIG. 5-5, the resource of the first PUCCH (i.e., PUCCH1) corresponding to the first HARQ-ACK codebook is at least determined by the PUCCH resource indicator in the last DL Grant (i.e., DL Grant 1) corresponding to the first HARQ-ACK codebook, and the resource of the second PUCCH (i.e., PUCCH2) corresponding to the second HARQ-ACK codebook is at least determined by the PUCCH resource indicator in the last DL Grant (i.e., DL Grant 2) corresponding to the second HARQ-ACK codebook. If there is no DL Grant scheduled transmission in PDSCH set corresponding to the HARQ-ACK codebook, that is, only SPS transmission is included, PUCCH resources preconfigured for SPS will be used as PUCCH resources corresponding to the HARQ-ACK codebook.

Figures 5, 6:
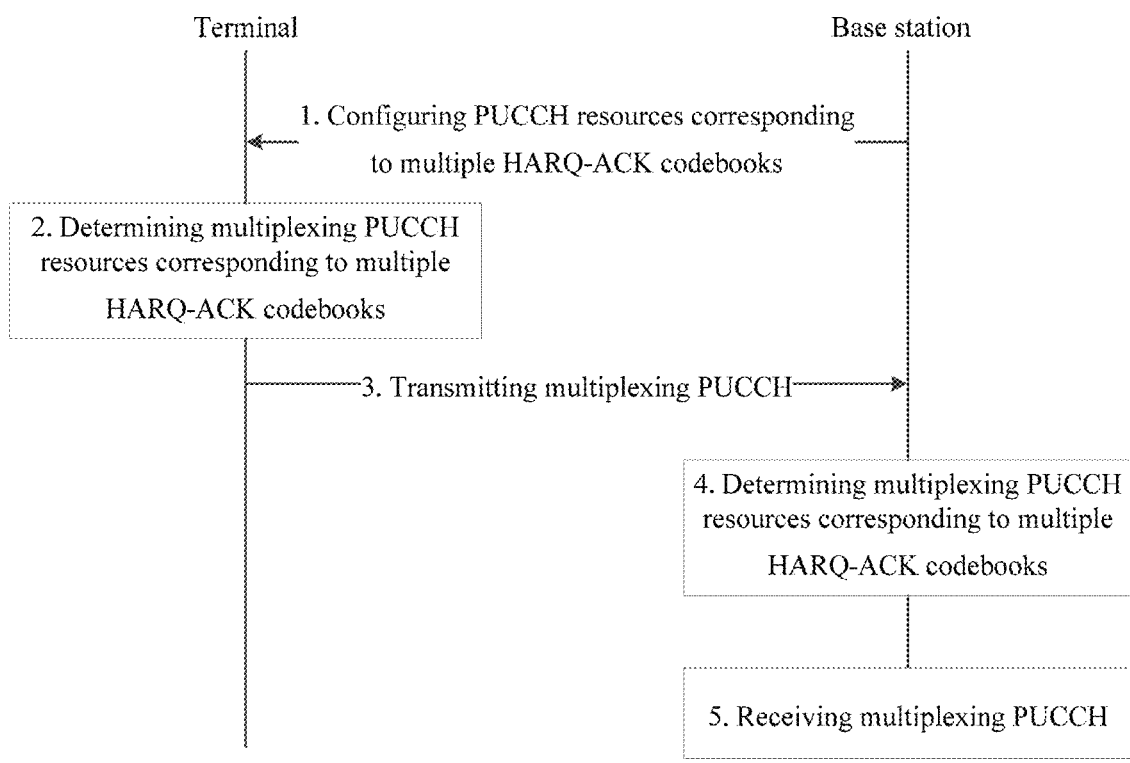

Referring to FIG. 5-6, it includes the following procedures: 1. the base station configures PUCCH resources corresponding to multiple HARQ-ACK codebooks for the terminal. 2. the terminal determines multiplexing PUCCH resources corresponding to multiple HARQ-ACK codebooks. 3. the terminal sends the multiplexing PUCCH on the multiplexing PUCCH resources, where the multiplexing PUCCH is used for transmitting the multiple HARQ-ACK codebooks. 4. the base station determines the multiplexing PUCCH resources corresponding to the multiple HARQ-ACK codebooks. 5. the base station receives the multiplexing PUCCH on the multiplexing PUCCH resources.

The steps of determining the multiplexing PUCCH resources corresponding to the multiple HARQ-ACK codebooks in the above procedures (i.e., step 2 and step 4) can be implemented in the following ways, where the multiplexing channel in the following embodiments can refer to multiplexing PUCCH.

Resource Determination Mode of the Multiplexing Channel

Mode 1: a resource of the multiplexing channel is determined based on a first indicator in a third DCI, where the first indicator is used for indicating the resource of the multiplexing channel; where the first feedback codebook is used for transmitting feedback information corresponding to a first PDSCH set, and the second feedback codebook is used for transmitting feedback information corresponding to a second PDSCH set; resources of the first PDSCH set and the second PDSCH set are scheduled by at least one DCI, and the third DCI refers to last DCI in the at least one DCI. Herein, a resource of the multiplexing channel is a resource indicated by the first indicator.

Herein, the feedback codebook can also be called HARQ-ACK codebook, and the feedback information is, for example, ACK feedback information or NACK feedback information. The multiplexing PUCCH resources are determined by PUCCH resource indicator in the last DL Grant (i.e., the third DCI) of multiple HARQ-ACK codebooks (called HARQ-ACK codebook set). In this way, the multiplexing PUCCH resources are determined by the last DL Grant, and the network can flexibly determine appropriate resources considering the feedback requirements of all PDSCH.

For example, when the terminal determines that PUCCH corresponding to the first HARQ-ACK codebook and PUCCH corresponding to the second HARQ-ACK codebook are multiplexed for transmission, the terminal determines the multiplexing PUCCH resources based on the PUCCH resource indicator in the last DL Grant corresponding to the first HARQ-ACK codebook and the second HARQ-ACK codebook.

Figures 5, 6, 7:
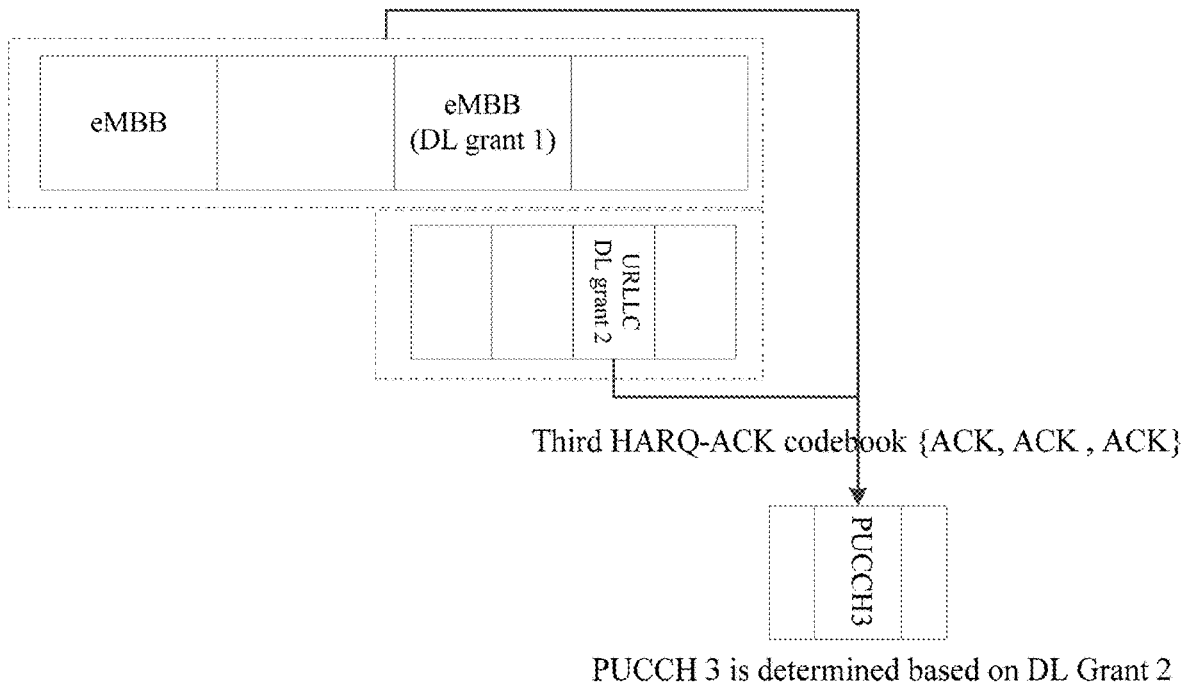

It should be noted that at least one PDSCH being in the PDSCH set corresponding to the first HARQ-ACK codebook and the second HARQ-ACK codebook is determined based on the DL Grant. In this case, the multiplexing PUCCH resources are determined by the PUCCH resource indicator in the last DL Grant (i.e., DL Grant 2) corresponding to the first HARQ-ACK codebook and the second HARQ-ACK codebook, as shown in FIG. 5-7.

Mode 2: a resource of the multiplexing channel is preconfigured or configured by a base station; where the first feedback codebook is used for transmitting feedback information corresponding to a first PDSCH set, and the second feedback codebook is used for transmitting feedback information corresponding to a second PDSCH set; the resources of the first PDSCH set and the second PDSCH set are all configured by semi-persistent signaling.

Specifically, when there is no PUSCH determined based on DL grant in the PDSCH set corresponding to the first HARQ-ACK codebook and the second HARQ-ACK codebook, the first HARQ-ACK codebook and the second HARQ-ACK codebook is transmitted by the predefined multiplexing PUCCH resource, as shown in FIG. 5-8, where the predefined multiplexing PUCCH resource can be configured by the base station or agreed by the protocol.

Mode 3: a resource of the multiplexing channel is determined based on a first indicator in a fourth DCI, where the first indicator is used for indicating the resource of the multiplexing channel; where the first feedback codebook is used for transmitting feedback information corresponding to a first PDSCH set, and the second feedback codebook is used for transmitting feedback information corresponding to a second PDSCH set, and priority of the first feedback codebook is higher than priority of the second feedback codebook; the first PDSCH set are scheduled by at least one DCI, and the fourth DCI refers to last DCI in the at least one DCI. Herein, a resource of the multiplexing channel is a resource indicated by the first indicator.

Specifically, the multiplexing PUCCH resource is determined by the PUCCH resource indicator in the last DL Grant corresponding to the high-priority HARQ-ACK codebook in the multiple HARQ-ACK codebooks. In this way, selecting PUCCH resources matched with high-priority services can preferentially guarantee the transmission of high-priority services.

In an example, when the terminal determines that PUCCH corresponding to the first HARQ-ACK codebook and PUCCH corresponding to the second HARQ-ACK codebook can be multiplexed, where the priority of the first HARQ-ACK codebook is higher than that of the second HARQ-ACK codebook, the terminal determines the multiplex PUCCH resource based on PUCCH resource indicator in the last DL Grant corresponding to the first HARQ-ACK codebook. As shown in FIG. 5-9, the priority of URLLC is higher than that of eMBB, so the multiplexing PUCCH resource is determined by the last DL Grant corresponding to the HARQ-ACK codebook corresponding to URLLC.

It should be noted that the priority discrimination method of HARQ-ACK codebook is similar to that of the first type of PUCCH and the second type of PUCCH.

Mode 4: a resource of the multiplexing channel is configured by semi-persistent signaling; where the first feedback codebook is used for transmitting feedback information corresponding to a first PDSCH set, and the second feedback codebook is used for transmitting feedback information corresponding to a second PDSCH set, and priority of the first feedback codebook is higher than priority of the second feedback codebook; the first PDSCH set is configured by semi-persistent signaling.

In an embodiment of the present application, after determining the multiplexing channel resource, the terminal generates a third feedback codebook based on the first feedback codebook and the second feedback codebook, and transmits the third feedback codebook through a multiplexing channel. For example, the terminal sends a third HARQ-ACK codebook based on the determined multiplexing PUCCH resource, where the third HARQ-ACK codebook is obtained by combining the first HARQ-ACK codebook and the second HARQ-ACK codebook.

In the above-mentioned technical solutions of embodiments of the present application, PUCCH particularly refers to PUCCH-ACK, that is, the PUCCH is used for transmitting HARQ-ACK feedback information or HARQ-ACK codebook. It should be noted that the technical solutions of the embodiments of the present application are also applicable to the multiplexing of other types of PUCCH, or scenarios where PUCCH and PUSCH are multiplexed (For example, multiplexing between PUCCH-ACK and PUCCH-CSI, or scenarios where PUCCH-ACK is multiplexed to PUSCH), as long as there are multiple PUCCHs and/or PUSCHs with multiple delay requirements of feedback, the technical solutions of the embodiments of the present application can be applied.

In the above-mentioned technical solutions of the embodiments of the present application, most are exemplified by two PUCCHs. It should be noted that the technical solutions of the embodiments of the present application are also applicable to three or more PUCCHs and PUSCHs, or multiplexing between PUCCHs. Specifically, every two PUCCHs or every two PUSCHs may be multiplexed by the above-mentioned methods successively.

FIG. 6 is a second schematic flow diagram of the method for determining the transmission mode provided by an embodiment of the present application, as shown in FIG. 6, the method for determining the transmission mode includes the following steps:

step 601: determining, by a network device, a transmission mode of uplink information of at least two PUCCHs according to time domain position and/or processing time of the at least two PUCCHs under a condition of determining that resources of the at least two PUCCHs have an overlapping part in time domain.

In an embodiment of the present application, the network device determines a transmission mode of uplink information of the at least two PUCCHs according to time domain position and/or processing time of the at least two PUCCHs under a condition of determining that resources of the at least two PUCCHs have an overlapping part in time domain. How to determine the transmission mode will be described separately in combination with the time domain position and the processing time.

The network device determines a transmission mode of uplink information of the at least two PUCCHs according to the time domain position of the at least two PUCCHs Further, in an embodiment, the network device determines a transmission mode of uplink information of the at least two PUCCHs according to time domain ending position of the at least two PUCCHs in time domain.

Further, in an embodiment, the at least two PUCCHs include a first type of PUCCH and a second type of PUCCH; the network device determines that uplink information of the at least two PUCCHs adopts a multiplexing transmission mode if a time domain ending position of the first type of PUCCH is in the back of or the same as a time domain ending position of the second type of PUCCH.

Further, in an embodiment, the network device sends first configuration information to the terminal, where the first configuration information is used for determining a candidate PUCCH set, and a time domain ending position of any candidate PUCCH in the candidate PUCCH set is in the front of or the same as the time domain ending position of the first type of PUCCH; where the second type of PUCCH belongs to the candidate PUCCH set.

Further, in an embodiment, the network device determines that only uplink information of the first type of PUCCH in the at least two PUCCHs is received, or the network device determines that only uplink information of the first type of PUCCH in the at least two PUCCHs is received in the overlapping part if the time domain ending position of the first type of PUCCH is in the front of the time domain ending position of the second type of PUCCH.

Herein, in an embodiment, the first type of PUCCH is a PUCCH with low latency requirement.

Further, in an embodiment, the network device determines that uplink information of the at least two PUCCHs adopts a multiplexing transmission mode if a time domain ending position of the first type of PUCCH is in the back of or the same as a time domain ending position of multiplexing channel; where the multiplexing channel is used for transmitting uplink information in the at least two PUCCHs.

Further, in an embodiment, the network device determines that only uplink information of the first type of PUCCH in the at least two PUCCHs is received, or the network device determines that only uplink information of the first type of PUCCH in the at least two PUCCHs is received in the overlapping part if the time domain ending position of the first type of PUCCH is in the front of the time domain ending position of the multiplexing channel.

Herein, in an embodiment, the first type of PUCCH is a PUCCH with a low latency requirement.

In an embodiment of the present application, the network device determines the first type of PUCCH and the second type of PUCCH based on at least one of the following:

service type corresponding to PUCCH;

delay requirement corresponding to PUCCH;

indicator carried in configuration information of physical downlink shared channel (PDSCH) corresponding to PUCCH;

resource configuration information corresponding to PUCCH.

For example, the first type of PUCCH corresponds to ultra reliable low latency communication (URLLC) service, and the second type of PUCCH-ACK corresponds to the enhance mobile broadband (eMBB) service.

For example, the first type of PUCCH corresponds to low latency service, and the second type of PUCCH corresponds to medium high latency service.

For example, the DL Grant (including explicit and implicit modes) or RRC configuration (mostly used for semi-persistent transmission) based on the PDSCH corresponding to the PUCCH indicates the first type of PUCCH and the second type of PUCCH.

For example, the first type of PUCCH and the second type of PUCCH are determined based on resource configuration information corresponding to PUCCH, where the resource configuration information includes at least one of the following: HARQ-ACK timing granularity, HARQ-ACK multiplexing window, PUCCH resource set, and HARQ-ACK codebook type. For example, the HARQ-ACK timing granularity of the first type of PUCCH is subslot, and the HARQ-ACK timing granularity of the second type of PUCCH is slot. For example, the HARQ-ACK multiplexing window of the first type of PUCCH is a subslot, and the multiplexing window of the second type of PUCCH is a slot. For example, the PUCCH resource set of the first type of PUCCH is configured for low latency, and the PUCCH resource set of the second type of PUCCH is configured for medium high latency. For example, the HARQ-ACK codebook of the first type of PUCCH is configured for low latency, and the HARQ-ACK codebook of the second type of PUCCH is configured for medium high latency.

In the above-mentioned solution, the granularity of judging the ending position in time domain can be symbol level or subslot (consisting of n symbols). Taking subslot as an example, as long as the subslot where the time domain ending position of the first type of PUCCH is located is not in the front of the subslot where the time domain ending position of the second type of PUCCH is located or the subslot where the time domain ending position of the multiplexing PUCCH is located, it is considered that the multiplexing condition is satisfied, and it is unnecessary to consider the sequence of the time domain ending positions of these PUCCHs in the same subslot.

The network device determines a transmission mode of uplink information of the at least two PUCCHs according to processing time of the at least two PUCCHs Further, in an embodiment, the network device determines that the uplink information of the at least two PUCCHs adopts a multiplexing transmission mode if time difference from a starting position of a target PUCCH to a time domain ending position of a target PDSCH is greater than or equal to a first time interval; where the first time interval at least includes a first time, and the first time is processing time of the terminal for PDSCH; the target PUCCH is one of the at least two PUCCHs or a multiplexing PUCCH, and the target PDSCH is one of at least two PDSCHs corresponding to the at least two PUCCHs; where the multiplexing PUCCH is used for transmitting uplink information in the at least two PUCCHs.

In an example, the target PUCCH is the earliest transmitted PUCCH in the at least two PUCCHs.

In an example, the target PUCCH is a multiplexing PUCCH, which is used for transmitting uplink information in the at least two PUCCHs, herein, the uplink information is, for example, HARQ-ACK feedback information.

In an example, the target PDSCH is the last PDSCH of at least two PDSCH corresponding to the at least two PUCCHs.

Further, in an embodiment, the network device determines that the uplink information of the at least two PUCCHs adopts a multiplexing transmission mode if a time difference from the starting position of target PUCCH to the time domain ending position of target PDSCH is greater than or equal to a first time interval, and a time difference from the starting position of the target PUCCH to the time domain ending position of target DCI is greater than or equal to a second time interval; where the second time interval at least includes a second time, and the second time is preparation time of the terminal for PUSCH; the target DCI is a DCI for scheduling the target PDSCH.

In the above-mentioned solutions, the unit of the time domain position is symbol or sub slot.

It should be noted that in the above embodiments, the time-domain location and processing time are taken as separate examples for description. In a specific implementation, the transmission mode can also be determined by considering the time-domain location and processing time comprehensively.

In an embodiment of the present application, the at least two PUCCHs at least includes a first PUCCH and a second PUCCH, where the first PUCCH is used for transmitting first UCI, and uplink information of the second PUCCH is second UCI; the network device receives the first UCI and the second UCI on a multiplexing channel under a condition of determining that uplink information of the first PUCCH and uplink information of the second PUCCH adopt a multiplexing transmission mode. Further, in an embodiment, under a condition that the network device determines that the first PUCCH and the second PUCCH cannot adopt the multiplexing transmission mode, only the first type of PUCCH (such as PUCCH with low latency) is transmitted, or only the first type of PUCCH (such as PUCCH with low latency) is transmitted in the overlapping part, and each PUCCH is independently transmitted in the non-overlapping part.

In an implementation of the present application, the at least two PUCCHs at least include a first PUCCH and a second PUCCH, where uplink information of the first PUCCH is a first feedback codebook and uplink information of the second PUCCH is a second feedback codebook; the network device receives the first feedback codebook and the second feedback codebook on a multiplexing channel under a condition of determining that uplink information of the first PUCCH and uplink information of the second PUCCH adopt a multiplexing transmission mode.

Further, in an embodiment, the resources of the first PUCCH and the second PUCCH may be determined by DL Grant and/or semi-persistent signaling.

1) Resource Determination Mode of the first PUCCH

Mode 1: a resource of the first PUCCH is determined based on a first indicator in a first DCI, where the first indicator is used for indicating the resource of the first PUCCH; where the first feedback codebook is used for transmitting feedback information corresponding to first PDSCH set; resources of the first PDSCH set are scheduled by at least one DCI, and the first DCI refers to last DCI in the at least one DCI.

Mode 2: a resource of the first PUCCH is determined based on second indicator in semi-persistent signaling, where the second indicator is used for indicating the resource of the first PUCCH; where the first feedback codebook is used for transmitting feedback information corresponding to first PDSCH set; the resources of the first PDSCH set are all configured by semi-persistent signaling.

2) Resource Determination Mode of the Second PUCCH

Mode 1: a resource of the second PUCCH is determined based on a first indicator in a second DCI, where the first indicator is used for indicating the resource of the second PUCCH; where the second feedback codebook is used for transmitting feedback information corresponding to a second PDSCH set; resources of the second PDSCH set are scheduled by at least one DCI, and the second DCI refers to last DCI in the at least one DCI.

Mode 2: a resource of the second PUCCH is determined based on a second indicator in semi-persistent signaling, where the second indicator is used for indicating the resource of the second PUCCH; where the second feedback codebook is used for transmitting feedback information corresponding to a second PDSCH set; the resources of the second PDSCH set are all configured by semi-persistent signaling.

Resource Determination Mode of the Multiplexing Channel

Mode 1: a resource of the multiplexing channel is determined based on a first indicator in a third DCI, where the first indicator is used for indicating the resource of the multiplexing channel; where the first feedback codebook is used for transmitting feedback information corresponding to a first PDSCH set, and the second feedback codebook is used for transmitting feedback information corresponding to a second PDSCH set; resources of the first PDSCH set and the second PDSCH set are scheduled by at least one DCI, and the third DCI refers to last DCI in the at least one DCI. Herein, a resource of the multiplexing channel is a resource indicated by the first indicator.

Mode 2: a resource of the multiplexing channel is pre-configured or configured by a base station; where the first feedback codebook is used for transmitting feedback information corresponding to a first PDSCH set, and the second feedback codebook is used for transmitting feedback information corresponding to a second PDSCH set; the resources of the first PDSCH set and the second PDSCH set are all configured by semi-persistent signaling.

Mode 3: a resource of the multiplexing channel is determined based on a first indicator in a fourth DCI, where the first indicator is used for indicating the resource of the multiplexing channel; where the first feedback codebook is used for transmitting feedback information corresponding to a first PDSCH set, and the second feedback codebook is used for transmitting feedback information corresponding to a second PDSCH set, and priority of the first feedback codebook is higher than priority of the second feedback codebook; the first PDSCH set are scheduled by at least one DCI, and the fourth DCI refers to last DCI in the at least one DCI. Herein, a resource of the multiplexing channel is a resource indicated by the first indicator.

Mode 4: a resource of the multiplexing channel is configured by semi-persistent signaling; where the first feedback codebook is used for transmitting feedback information corresponding to a first PDSCH set, and the second feedback codebook is used for transmitting feedback information corresponding to a second PDSCH set, and priority of the first feedback codebook is higher than priority of the second feedback codebook; the first PDSCH set is configured by semi-persistent signaling.

In an embodiment of the present application, after determining the multiplexing channel resource, the network device receives a third feedback codebook on a multiplexing channel, where the third feedback codebook is generated based on the first feedback codebook and the second feedback codebook.

It should be noted that the above-mentioned technical solutions of the embodiments of the present application can be understood with reference to the foregoing description for the terminal side.

FIG. 7 is a first schematic diagram of the structural composition of a channel transmission apparatus provided by an embodiment of the present application, the channel transmission apparatus is applied to a terminal. As shown in FIG. 7, the channel transmission apparatus includes:

a determining unit 701, configured to determine a transmission mode of uplink information of at least two PUCCHs according to time domain position and/or processing time of the at least two PUCCHs under a condition of determining that resources of the at least two PUCCHs have an overlapping part in time domain.

In an implementation, the at least two PUCCHs include a first type of PUCCH and a second type of PUCCH;

the determining unit is configured to determine that uplink information of the at least two PUCCHs adopts a multiplexing transmission mode if a time domain ending position of the first type of PUCCH is in the back of or the same as a time domain ending position of the second type of PUCCH.

In an implementation, the apparatus further includes:

a receiving unit 702, configured to receive first configuration information sent by a network device, where the first configuration information is used for determining a candidate PUCCH set, and a time domain ending position of any candidate PUCCH in the candidate PUCCH set is in the front of or the same as the time domain ending position of the first type of PUCCH;

where the second type of PUCCH belongs to the candidate PUCCH set.

In an implementation, the determining unit 701 is configured to determine that only uplink information of the first type of PUCCH in the at least two PUCCHs is transmitted, or determine that only uplink information of the first type of PUCCH in the at least two PUCCHs is transmitted in the overlapping part if the time domain ending position of the first type of PUCCH is in the front of the time domain ending position of the second type of PUCCH.

In an implementation, the at least two PUCCHs include a first type of PUCCH and a second type of PUCCH;

the determining unit 701 is configured to determine that uplink information of the at least two PUCCHs adopts a multiplexing transmission mode if a time domain ending position of the first type of PUCCH is in the back of or the same as a time domain ending position of multiplexing channel;

where the multiplexing channel is used for transmitting uplink information in the at least two PUCCHs.

In an implementation, the determining unit 701 is further configured to determine that only uplink information of the first type of PUCCH in the at least two PUCCHs is transmitted, or determine that only uplink information of the first type of PUCCH in the at least two PUCCHs is transmitted in the overlapping part if the time domain ending position of the first type of PUCCH is in the front of a time domain ending position of multiplexing channel.

In an implementation, the determining unit 701 is further configured to determine the first type of PUCCH and the second type of PUCCH based on at least one of the following:

service type corresponding to PUCCH;

delay requirement corresponding to PUCCH;

indicator carried in configuration information of physical downlink shared channel (PDSCH) corresponding to PUCCH;

resource configuration information corresponding to PUCCH.

In an implementation, the determining unit 701 is configured to determine that the uplink information of the at least two PUCCHs adopts a multiplexing transmission mode if time difference from a starting position of a target PUCCH to a time domain ending position of a target PDSCH is greater than or equal to a first time interval;

where the first time interval at least includes a first time, and the first time is processing time of the terminal for PDSCH; the target PUCCH is one of the at least two PUCCHs or a multiplexing PUCCH, and the target PDSCH is one of at least two PDSCHs corresponding to the at least two PUCCHs;

where the multiplexing PUCCH is used for transmitting uplink information in the at least two PUCCHs.

In an implementation, the determining unit 701 is configured to determine that the uplink information of the at least two PUCCHs adopts a multiplexing transmission mode if time difference from the starting position of target PUCCH to the time domain ending position of target PDSCH is greater than or equal to a first time interval, and time difference from the starting position of the target PUCCH to the time domain ending position of target DCI is greater than or equal to a second time interval;

where the second time interval at least includes a second time, and the second time is preparation time of the terminal for the physical uplink shared channel (PUSCH); the target DCI is a DCI for scheduling the target PDSCH.

In an implementation, the determining unit 701 is configured to determine that only uplink information of first type of PUCCH in the at least two PUCCHs is transmitted, or determine that only uplink information of first type of PUCCH in the at least two PUCCHs is transmitted in the overlapping part if time difference from the starting position of the target PUCCH to the time domain ending position of the target PDSCH is less than the first time interval.

In an implementation, the unit of the time domain position is a symbol or a subslot.

In an implementation, the at least two PUCCHs at least include a first PUCCH and a second PUCCH, where uplink information of the first PUCCH is first uplink control information (UCI), and uplink information of the second PUCCH is second UCI; the apparatus further includes:

a transmitting unit 703, configured to transmit the first UCI and the second UCI through a multiplexing channel under the condition that the determining unit determines that the uplink information of the first PUCCH and the uplink information of the second PUCCH adopt a multiplexing transmission mode.

In an implementation, the at least two PUCCHs at least include a first PUCCH and a second PUCCH, where uplink information of the first PUCCH is a first feedback codebook and uplink information of the second PUCCH is a second feedback codebook; the apparatus further includes:

a transmitting unit 703, configured to transmit the first feedback codebook and the second feedback codebook through a multiplexing channel under the condition that the determining unit determines that the uplink information of the first PUCCH and the uplink information of the second PUCCH adopt a multiplexing transmission mode.

In an implementation, a resource of the first PUCCH is determined based on a first indicator in a first DCI, where the first indicator is used for indicating the resource of the first PUCCH;

where the first feedback codebook is used for transmitting feedback information corresponding to first PDSCH set; resources of the first PDSCH set are scheduled by at least one DCI, and the first DCI refers to last DCI in the at least one DCI.

In an implementation, a resource of the first PUCCH is determined based on a second indicator in semi-persistent signaling, where the second indicator is used for indicating the resource of the first PUCCH;

where the first feedback codebook is used for transmitting feedback information corresponding to first PDSCH set; the resources of the first PDSCH set are all configured by semi-persistent signaling.

In an implementation, a resource of the second PUCCH is determined based on a first indicator in a second DCI, where the first indicator is used for indicating the resource of the second PUCCH;

where the second feedback codebook is used for transmitting feedback information corresponding to a second PDSCH set; resources of the second PDSCH set are scheduled by at least one DCI, and the second DCI refers to last DCI in the at least one DCI.

In an implementation, a resource of the second PUCCH is determined based on a second indicator in semi-persistent signaling, where the second indicator is used for indicating the resource of the second PUCCH;

where the second feedback codebook is used for transmitting feedback information corresponding to a second PDSCH set; the resources of the second PDSCH set are all configured by semi-persistent signaling.

In an implementation, a resource of the multiplexing channel is determined based on a first indicator in a third DCI, where the first indicator is used for indicating the resource of the multiplexing channel;

where the first feedback codebook is used for transmitting feedback information corresponding to a first PDSCH set, and the second feedback codebook is used for transmitting feedback information corresponding to a second PDSCH set; resources of the first PDSCH set and the second PDSCH set are scheduled by at least one DCI, and the third DCI refers to last DCI in the at least one DCI.

In an implementation, a resource of the multiplexing channel is preconfigured or configured by a base station;

where the first feedback codebook is used for transmitting feedback information corresponding to a first PDSCH set, and the second feedback codebook is used for transmitting feedback information corresponding to a second PDSCH set; the resources of the first PDSCH set and the second PDSCH set are all configured by semi-persistent signaling.

In an implementation, a resource of the multiplexing channel is determined based on first indicator in a fourth DCI, where the first indicator is used for indicating the resource of the multiplexing channel;

where the first feedback codebook is used for transmitting feedback information corresponding to a first PDSCH set, and the second feedback codebook is used for transmitting feedback information corresponding to a second PDSCH set, and priority of the first feedback codebook is higher than priority of the second feedback codebook; the first PDSCH set are scheduled by at least one DCI, and the fourth DCI refers to last DCI in the at least one DCI.

In an implementation, a resource of the multiplexing channel is a resource indicated by the first indicator.

In an implementation, a resource of the multiplexing channel is configured by semi-persistent signaling;

where the first feedback codebook is used for transmitting feedback information corresponding to a first PDSCH set, and the second feedback codebook is used for transmitting feedback information corresponding to a second PDSCH set, and priority of the first feedback codebook is higher than priority of the second feedback codebook; the first PDSCH set is configured by semi-persistent signaling.

In an implementation, the transmitting unit 703 is configured to generate a third feedback codebook based on the first feedback codebook and the second feedback codebook, and transmit the third feedback codebook through a multiplexing channel.

Those skilled in the art should understand that the related descriptions of the above-mentioned channel transmission apparatuses in the embodiments of the present application can be understood with reference to the related descriptions of the channel transmission methods in the embodiments of the present application.

Figures 5, 6, 7, 8:
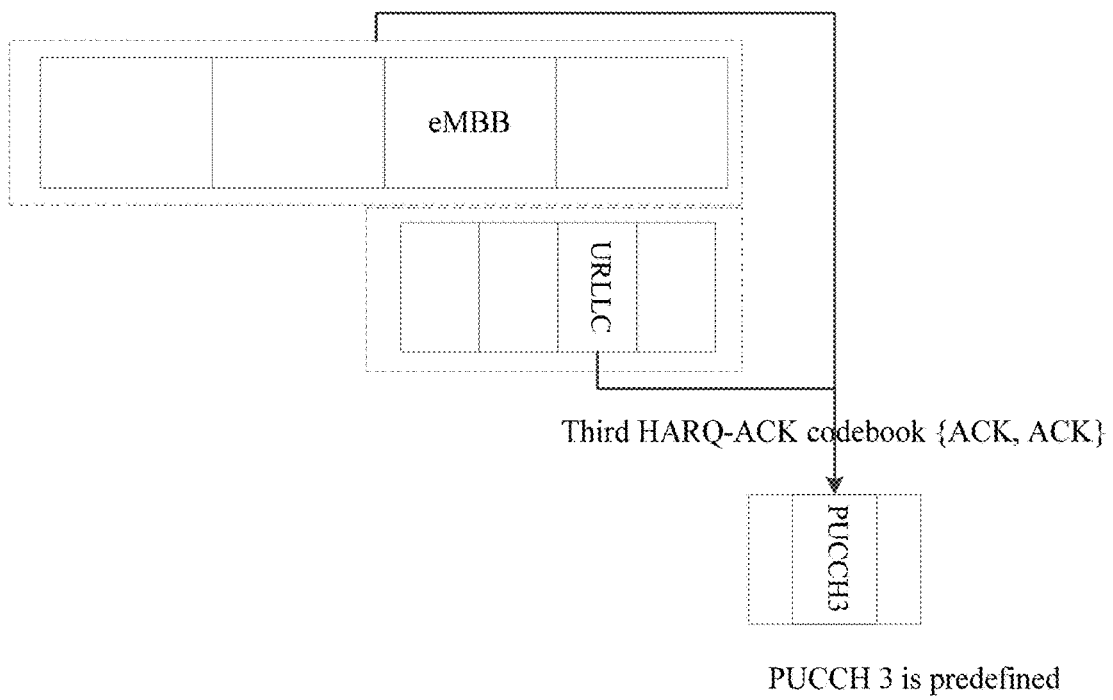

FIG. 8 is a second schematic diagram of the structural composition of the channel transmission apparatus provided by an embodiment of the present application, the channel transmission apparatus is applied to a network device. As shown in FIG. 8, the channel transmission apparatus includes:

a determining unit 801, configured to determine a transmission mode of uplink information of at least two PUCCHs according to time domain position and/or processing time of the at least two PUCCHs under a condition of determining that resources of the at least two PUCCHs have an overlapping part in time domain.

In an implementation, the at least two PUCCHs include a first type of PUCCH and a second type of PUCCH;

the determining unit 801 is configured to determine that uplink information of the at least two PUCCHs adopts a multiplexing transmission mode if a time domain ending position of the first type of PUCCH is in the back of or the same as a time domain ending position of the second type of PUCCH;

In an implementation, the apparatus further includes:

a sending unit 802, configured to send first configuration information to a terminal, where the first configuration information is used for determining a candidate PUCCH set, and a time domain ending position of any candidate PUCCH in the candidate PUCCH set is in the front of or the same as the time domain ending position of the first type of PUCCH;

where the second type of PUCCH belongs to the candidate PUCCH set.

In an implementation, the determining unit 801 is configured to determine that only uplink information of the first type of PUCCH in the at least two PUCCHs is received, or determine that only uplink information of the first type of PUCCH in the at least two PUCCHs is received in the overlapping part if the time domain ending position of the first type of PUCCH is in the front of the time domain ending position of the second type of PUCCH.

In an implementation, the at least two PUCCHs include a first type of PUCCH and a second type of PUCCH;

the determining unit 801 is configured to determine that uplink information of the at least two PUCCHs adopts a multiplexing transmission mode if a time domain ending position of the first type of PUCCH is in the back of or the same as a time domain ending position of multiplexing channel;

where the multiplexing channel is used for transmitting uplink information in the at least two PUCCHs.

In an implementation, the determining unit 801 is further configured to determine that only uplink information of the first type of PUCCH in the at least two PUCCHs is received, or determine that only uplink information of the first type of PUCCH in the at least two PUCCHs is received in the overlapping part if the time domain ending position of the first type of PUCCH is in the front of a time domain ending position of multiplexing channel.

In an implementation, the determining unit 801 is further configured to determine the first type of PUCCH and the second type of PUCCH based on at least one of the following:

service type corresponding to PUCCH;

delay requirement corresponding to PUCCH;

indicator carried in configuration information of physical downlink shared channel (PDSCH) corresponding to PUCCH;

resource configuration information corresponding to PUCCH.

In an implementation, the determining unit 801 is configured to determine that the uplink information of the at least two PUCCHs adopts a multiplexing transmission mode if time difference from a starting position of a target PUCCH to a time domain ending position of a target PDSCH is greater than or equal to a first time interval;

where the first time interval at least includes a first time, and the first time is processing time of the terminal for PDSCH; the target PUCCH is one of the at least two PUCCHs or a multiplexing PUCCH, and the target PDSCH is one of at least two PDSCHs corresponding to the at least two PUCCHs; where the multiplexing PUCCH is used for transmitting uplink information in the at least two PUCCHs.

In an implementation, the determining unit 801 is configured to determine that the uplink information of the at least two PUCCHs adopts a multiplexing transmission mode if time difference from the starting position of target PUCCH to the time domain ending position of target PDSCH is greater than or equal to a first time interval, and time difference from the starting position of the target PUCCH to the time domain ending position of target DCI is greater than or equal to a second time interval;

where the second time interval at least includes a second time, and the second time is preparation time of the terminal for PUSCH; the target DCI is a DCI for scheduling the target PDSCH.

In an implementation, the determining unit 801 is configured to determine that only uplink information of first type of PUCCH in the at least two PUCCHs is received, or determine that only uplink information of first type of PUCCH in the at least two PUCCHs is received in the overlapping part if time difference from the starting position of the target PUCCH to the time domain ending position of the target PDSCH is less than the first time interval.

In an implementation, the unit of the time domain position is a symbol or a subslot.

In an implementation, the at least two PUCCHs at least include a first PUCCH and a second PUCCH, where uplink information of the first PUCCH is first uplink control information (UCI), and uplink information of the second PUCCH is second UCI; the apparatus further includes:

a receiving unit 803, configured to receive the first UCI and the second UCI on a multiplexing channel under the condition that the determining unit determines that the uplink information of the first PUCCH and the uplink information of the second PUCCH adopt a multiplexing transmission mode.

In an implementation, the at least two PUCCHs at least include a first PUCCH and a second PUCCH, where uplink information of the first PUCCH is a first feedback codebook and uplink information of the second PUCCH is a second feedback codebook; the apparatus further includes:

a receiving unit 803, configured to receive the first feedback codebook and the second feedback codebook on a multiplexing channel under the condition that the determining unit determines that the uplink information of the first PUCCH and the uplink information of the second PUCCH adopt a multiplexing transmission mode.

In an implementation, a resource of the first PUCCH is determined based on a first indicator in a first DCI, where the first indicator is used for indicating the resource of the first PUCCH;

where the first feedback codebook is used for transmitting feedback information corresponding to first PDSCH set; resources of the first PDSCH set are scheduled by at least one DCI, and the first DCI refers to last DCI in the at least one DCI.

In an implementation, a resource of the first PUCCH is determined based on a second indicator in semi-persistent signaling, where the second indicator is used for indicating the resource of the first PUCCH;

where the first feedback codebook is used for transmitting feedback information corresponding to first PDSCH set; the resources of the first PDSCH set are all configured by semi-persistent signaling.

In an implementation, a resource of the second PUCCH is determined based on a first indicator in a second DCI, where the first indicator is used for indicating the resource of the second PUCCH;

where the second feedback codebook is used for transmitting feedback information corresponding to a second PDSCH set; resources of the second PDSCH set are scheduled by at least one DCI, and the second DCI refers to last DCI in the at least one DCI.

In an implementation, a resource of the second PUCCH is determined based on a second indicator in semi-persistent signaling, where the second indicator is used for indicating the resource of the second PUCCH;

where the second feedback codebook is used for transmitting feedback information corresponding to a second PDSCH set; the resources of the second PDSCH set are all configured by semi-persistent signaling.

In an implementation, a resource of the multiplexing channel is determined based on a first indicator in a third DCI, where the first indicator is used for indicating the resource of the multiplexing channel;

where the first feedback codebook is used for transmitting feedback information corresponding to a first PDSCH set, and the second feedback codebook is used for transmitting feedback information corresponding to a second PDSCH set; resources of the first PDSCH set and the second PDSCH set are scheduled by at least one DCI, and the third DCI refers to last DCI in the at least one DCI.

In an implementation, a resource of the multiplexing channel is preconfigured or configured by a base station;

where the first feedback codebook is used for transmitting feedback information corresponding to a first PDSCH set, and the second feedback codebook is used for transmitting feedback information corresponding to a second PDSCH set; the resources of the first PDSCH set and the second PDSCH set are all configured by semi-persistent signaling.

In an implementation, a resource of the multiplexing channel is determined based on a first indicator in a fourth DCI, where the first indicator is used for indicating the resource of the multiplexing channel;

where the first feedback codebook is used for transmitting feedback information corresponding to a first PDSCH set, and the second feedback codebook is used for transmitting feedback information corresponding to a second PDSCH set, and priority of the first feedback codebook is higher than priority of the second feedback codebook; the first PDSCH set are scheduled by at least one DCI, and the fourth DCI refers to last DCI in the at least one DCI.

In an implementation, a resource of the multiplexing channel is a resource indicated by the first indicator.

In an implementation, a resource of the multiplexing channel is configured by semi-persistent signaling;

where the first feedback codebook is used for transmitting feedback information corresponding to a first PDSCH set, and the second feedback codebook is used for transmitting feedback information corresponding to a second PDSCH set, and priority of the first feedback codebook is higher than priority of the second feedback codebook; the first PDSCH set is configured by semi-persistent signaling.

In an implementation, the receiving unit 803 is configured to receive a third feedback codebook on a multiplexing channel, where the third feedback codebook is generated based on the first feedback codebook and the second feedback codebook.

Those skilled in the art should understand that the related descriptions of the above-mentioned channel transmission apparatuses in the embodiments of the present application can be understood with reference to the related descriptions of the channel transmission methods in the embodiments of the present application.

Figures 5, 6, 7, 8, 9:
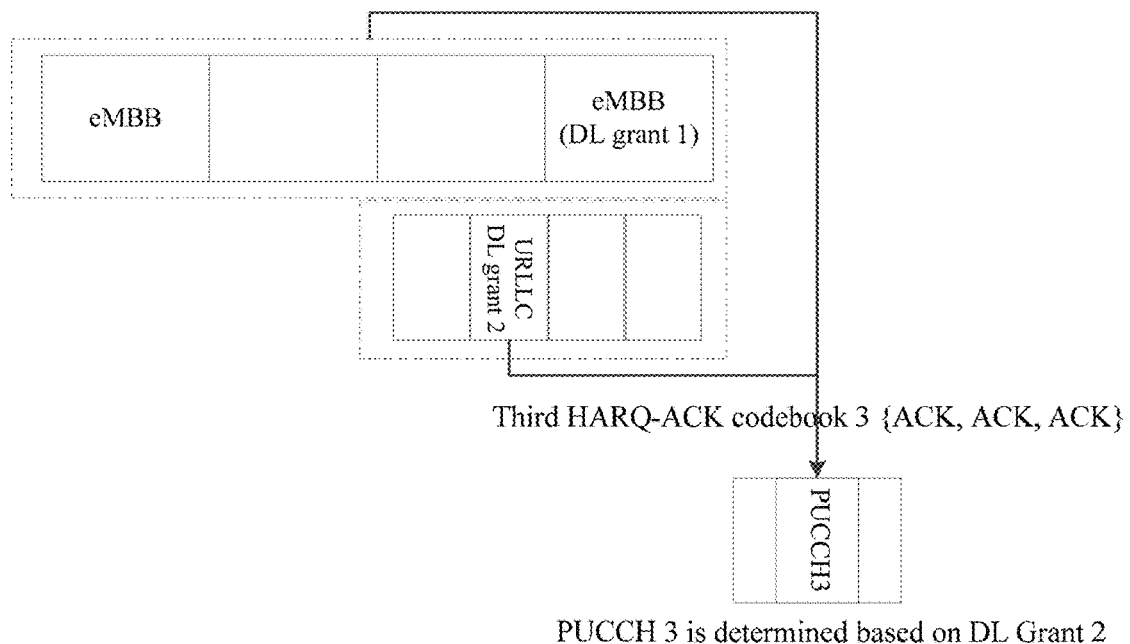
Figure 7:
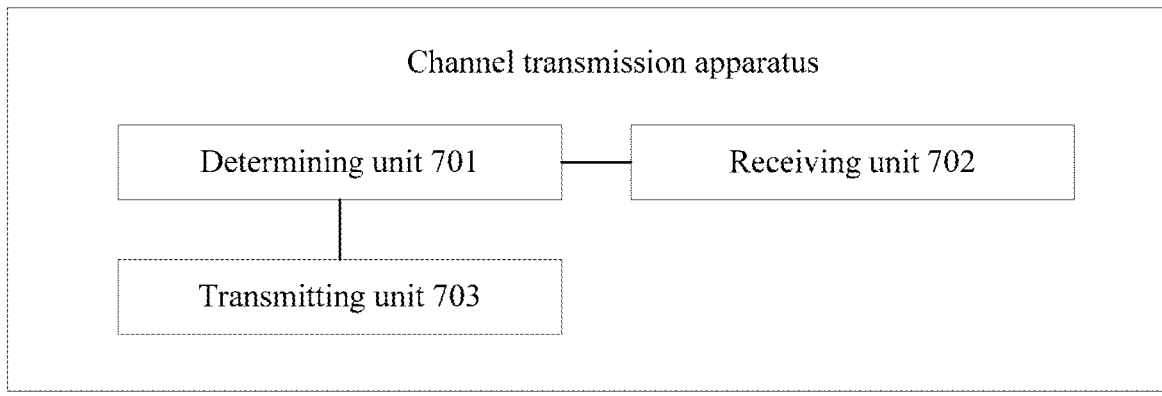
Figure 8:
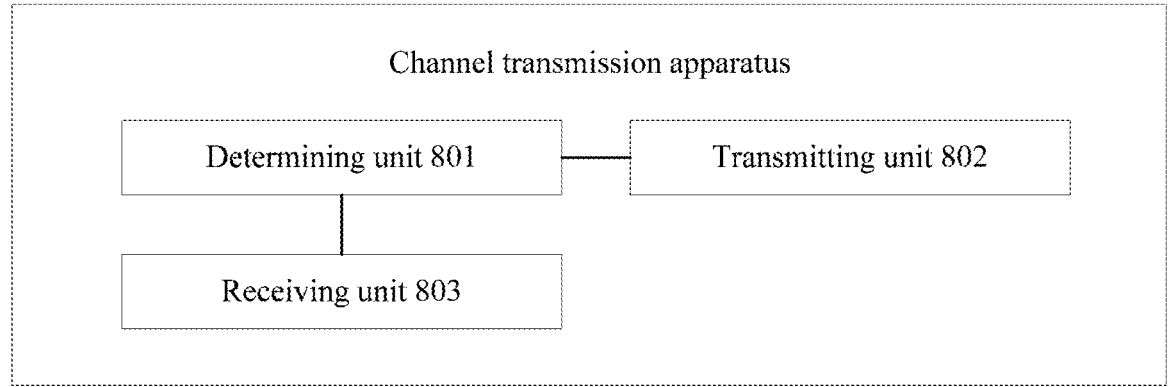
Figure 9:
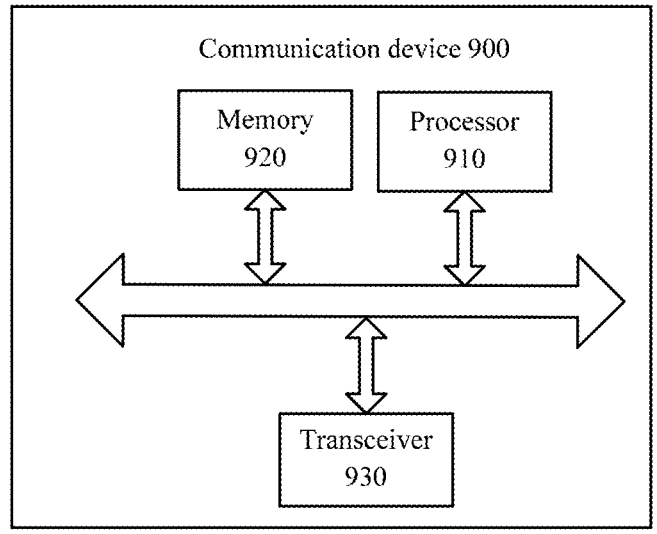

FIG. 9 is a schematic structural diagram of a communication device 900 provided by an embodiment of the present application. The communication device may be a terminal or a network device, and the communication device 900 shown in FIG. 9 includes a processor 910, and the processor 910 may call and run a computer program from a memory to implement the methods in the embodiments of the present application.

In an embodiment, as shown in FIG. 9, the communication device 900 may further include a memory 920, where the processor 910 can call and run a computer program from the memory 920 to implement the methods in the embodiments of the present application.

The memory 920 may be a separate device independent of the processor 910 or integrated into the processor 910.

In an embodiment, as shown in FIG. 9, the communication device 900 may further include a transceiver 930, and the processor 910 may control the transceiver 930 to communicate with other devices, and specifically, send information or data to other devices, or receive information or data sent by other devices.

The transceiver 930 may include a transmitter and a receiver. Transceiver 930 may further include antennas, and the number of antennas may be one or more.

In an embodiment, the communication device 900 can be specifically a network device of the embodiments of the present application, and the communication device 900 can implement the corresponding processes implemented by the network device in various methods of the embodiments of the present application, which will not be repeated herein for brevity.

In an embodiment, the communication device 900 can be specifically a mobile terminal/terminal of the embodiments of the present application, and the communication device 900 can implement the corresponding processes implemented by the mobile terminal/terminal in various methods of the embodiments of the present application, which will not be repeated herein for brevity.

Figure 10:
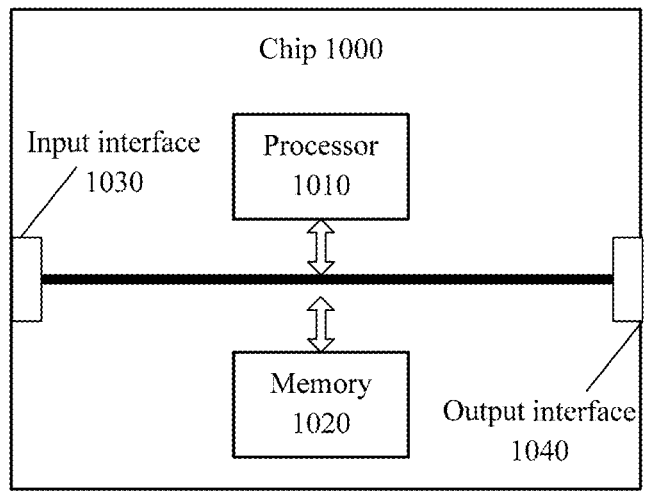
FIG. 10 is a schematic structural diagram of a chip of an embodiment of the present application.

FIG. 10 is a schematic structural diagram of a chip of an embodiment of the present application. The chip 1000 shown in FIG. 10 includes a processor 1010, and the processor 1010 can call and run a computer program from a memory to implement the methods in the embodiments of the present application.

In an embodiment, as shown in FIG. 10, the chip 1000 may further include a memory 1020. Where the processor 1010 can call and run a computer program from the memory 1020 to implement the methods in the embodiments of the present application.

The memory 1020 may be a separate device independent of the processor 1010 or integrated in the processor 1010.

In an embodiment, the chip 1000 may further include an input interface 1030, where the processor 1010 can control the input interface 1030 to communicate with other devices or chips, and specifically, can acquire information or data sent by other devices or chips.

In an embodiment, the chip 1000 may further include an output interface 1040, where the processor 1010 can control the output interface 1040 to communicate with other devices or chips, and specifically, can output information or data to other devices or chips.

In an embodiment, the chip can be applied to the network device in the embodiments of the present application, and the chip can implement the corresponding processes implemented by the network device in various methods of the embodiments of the present application, which will not be repeated herein for brevity.

In an embodiment, the chip can be applied to the mobile terminal/terminal in the embodiments of the present application, and the chip can implement the corresponding processes implemented by the mobile terminal/terminal in various methods of the embodiments of the present application, which will not be repeated herein for brevity.

It should be understood that the chips mentioned in the embodiments of the present application can also be called a system-level chip, system chip, chip system or system-on-chip chip.

Figure 11:
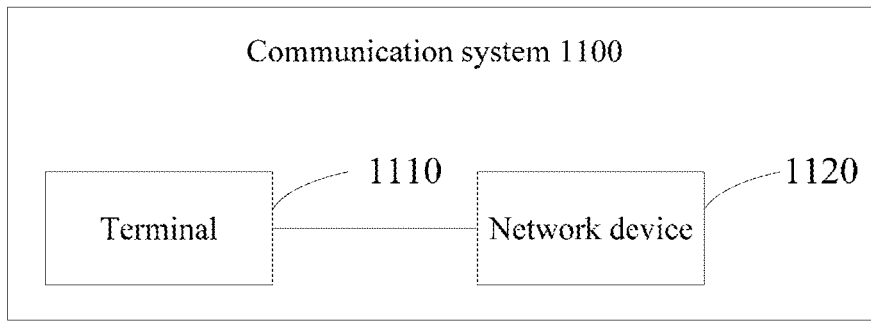
FIG. 11 is a schematic block diagram of a communication system provided by an embodiment of the present application.

FIG. 11 is a schematic block diagram of a communication system 1100 provided by an embodiment of the present application. As shown in FIG. 11, the communication system 1100 includes a terminal 1110 and a network device 1120.

The terminal 1110 can be configured to implement the corresponding functions implemented by the terminal in the above methods, and the network device 1120 can be configured to implement the corresponding functions implemented by the network device in the above methods, which will not be repeated herein for brevity.

It should be understood that the processor of the embodiment of the present application may be an integrated circuit chip with signal processing capability. In a process of implementation, each step of the foregoing method embodiments may be done by an integrated logic circuit of hardware in a processor or an instruction in a form of software. The foregoing processor may be a general purpose processor, a digital signal processor (DSP), an application specific integrated circuit (ASIC), a field programmable gate array (FPGA), or other programming logic device, a discrete gate, or a transistor logic device, a discrete hardware component. Each of methods, steps, and logical block diagrams disclosed in the embodiments of the present application can be implemented or executed. The general purpose processor may be a microprocessor or any conventional processor, etc. The steps of the method disclosed in the embodiments of the present application may be directly embodied as being implemented by a hardware decoding processor, or being implemented by a combination of hardware and software modules in the decoding processor. The software module can be located in a conventional storage medium in the prior art, such as a random access memory, a flash memory, a read only memory, a programmable read only memory or an electrically erasable programmable memory, a register, etc. The storage medium is located in the memory, and the processor reads information in the memory and performs the steps of the foregoing method in conjunction with its hardware.

It should be understood that the memory in the embodiments of the present application may be a volatile memory or a non-volatile memory, or may include both volatile and non-volatile memory. The non-volatile memory may be a read-only memory (ROM), a programmable read-only memory (PROM), an erasable programmable read-only memory (EPROM), or an electrically erasable programmable read-only memory (EEPROM) or a flash memory. The volatile memory can be a random access memory (RAM) that acts as an external cache. By way of example and not limitation, many forms of RAM are available, such as static random access memory (SRAM), dynamic random access memory (DRAM), synchronous dynamic random access memory (SDRAM), double data rate synchronous dynamic random access memory (DDR SDRAM), enhanced synchronous dynamic random access memory (ESDRAM), Synchlink dynamic random access memory (SLDRAM)) and direct rambus random access memory (DR RAM). It should be noted that the memory according to the systems and method described herein are intended to include, but is not limited to, these and any other suitable types of memory.

It should be understood that the above-mentioned memory is an exemplary but not restrictive description. For example, the memory in the embodiments of the present application can also be static random access memory (SRAM), dynamic random access memory (DRAM), synchronous dynamic random access memory (SDRAM), double data rate synchronous dynamic random access memory (DDR SDRAM), enhanced synchronous dynamic random access memory (ESDRAM), synch link dynamic random access memory (SLDRAM), and direct rambus random access memory (DR RAM), etc. In other words, the memory in the embodiments of the present application is intended to include, but is not limited to, these and any other suitable types of memories.

An embodiment of the present application also provides a computer-readable storage medium for storing a computer program.

In an embodiment, the computer-readable storage medium can be applied to the network device in the embodiments of the present application, and the computer program causes a computer to execute the corresponding procedures implemented by the network device in various methods of the embodiments of the present application, which will not be repeated herein for brevity.

In an embodiment, the computer-readable storage medium can be applied to the mobile terminal/terminal in the embodiments of the present application, and the computer program causes a computer to execute the corresponding procedures implemented by the mobile terminal/terminal in various methods of the embodiments of the present application, which will not be repeated herein for brevity.

An embodiment of the present application also provides a computer program product, which includes computer program instructions.

In an embodiment, the computer program product can be applied to the network device in the embodiments of the present application, and the computer program instructions cause a computer to execute the corresponding procedures implemented by the network device in various methods of the embodiments of the present application, which will not be repeated herein for brevity.

In an embodiment, the computer program product can be applied to the mobile terminal/terminal in the embodiments of the present application, and the computer program instructions cause a computer to execute the corresponding procedures implemented by the mobile terminal/terminal in various methods of the embodiments of the present application, which will not be repeated herein for brevity.

An embodiment of the present application also provides a computer program.

In an embodiment, the computer program can be applied to the network device in the embodiments of the present application, and when the computer program runs on a computer, causes the computer to execute the corresponding procedures implemented by the network device in various methods of the embodiments of the present application, which will not be repeated herein for brevity.

In an embodiment, the computer program can be applied to the mobile terminal/terminal in the embodiments of the present application, and when the computer program runs on a computer, causes the computer to execute the corresponding procedures implemented by the mobile terminal/terminal in various methods of the embodiments of the present application, which will not be repeated herein for brevity.

Those of ordinary skill in the art will appreciate that units and algorithm steps of the various examples described in connection with the embodiments disclosed herein can be implemented in electronic hardware or a combination of computer software and electronic hardware. Whether these functions are implemented in hardware or software depends on a specific application and design constraints of the technical solutions. Professionals can use different methods for each specific application to implement the described functionality, but this kind of implementation should not be considered beyond the scope of the present application.

A person skilled in the art can clearly understand that for the convenience and brevity of the description, specific working processes of a system, an apparatus and a unit described above can refer to the corresponding processes in the foregoing method embodiments, and details are not described herein again.

In the several embodiments provided by the present application, it should be understood that the disclosed system, apparatus, and method may be implemented in other manners. For example, the apparatus embodiments described above are only illustrative. For example, the division of the units is only a logical function division, and there may be other divisions in actual implementation, for example, multiple units or components may be combined or integrated into another system, or some features can be ignored or not implemented. In addition, the mutual coupling or direct coupling or communication connection shown or discussed may be an indirect coupling or communication connection through some interfaces, apparatuses or units, and may be electrical, mechanical or other forms.

The units described as separate components may or may not be physically separated, and the components displayed as units may or may not be physical units, that is, may be located in one location, or may be distributed to multiple network units. Some or all of the units may be selected according to actual needs to achieve the purpose of the solution of the present embodiments.

Furthermore, each functional unit in the various embodiments of the present application may be integrated into one processing unit, or each unit may be separate physically, or two or more units may be integrated into one unit.

The functions may be stored in a computer-readable storage medium if implemented in the form of a software functional unit and sold or used as a standalone product. Based on such understanding, the technical solution of the present application, in nature, or a part makes contributions to the prior art, or a part of the technical solution, may be embodied in the form of a software product, where the computer software product is stored in a storage medium, including a plurality of instructions to cause a computer device (which may be a personal computer, a server, or a network device, etc.) to perform all or part of the steps of the method described in the various embodiments of the present application. The foregoing storage medium includes various medium that can store program codes, such as, a USB flash disk, a mobile hard disk, a read-only memory (ROM), a random access memory (RAM), a magnetic disk, or an optical disk, etc.

The foregoing description is only specific embodiments of the present application; however, the scope of protection of the present application is not limited thereto, and changes or substitutions that can be readily think of by any person skilled in the art within the technical scope disclosed in the present application shall be covered by the scope of protection of the present application. Therefore, the scope of protection of the present application shall be subject to the scope of protection of the claims.

What is claimed is:

1. A channel transmission method, wherein the method comprises:
determining, by a terminal, a transmission mode of uplink information of at least two physical uplink control channels (PUCCH), according to at least one of time domain position and processing time of the at least two PUCCHs under a condition of determining that resources of the at least two PUCCHs have an overlapping part in time domain, wherein the uplink information comprises an HARQ-ACK feedback;
wherein the at least two PUCCHs at least comprise a first PUCCH and a second PUCCH, uplink information of the first PUCCH is a first feedback codebook, and uplink information of the second PUCCH is a second feedback codebook;
the method further comprises:
transmitting, by the terminal, the first feedback codebook and the second feedback codebook through a multiplexing channel under a condition of determining that the uplink information of the first PUCCH and the uplink information of the second PUCCH adopt a multiplexing transmission mode;
wherein a resource of the multiplexing channel is determined based on a first indicator in a fourth DCI, and the first indicator is used for indicating the resource of the multiplexing channel;
wherein the first feedback codebook is used for transmitting feedback information corresponding to a first PDSCH set, the second feedback codebook is used for transmitting feedback information corresponding to a second PDSCH set, and priority of the first feedback codebook is higher than priority of the second feedback codebook; the first PDSCH set are scheduled by at least one DCI, and the fourth DCI refers to last DCI in the at least one DCI.

2. The method according to claim 1, wherein the at least two PUCCHs comprise a first type of PUCCH and a second type of PUCCH;
the determining, by a terminal, a transmission mode of uplink information of at least two PUCCHs according to time domain position of the at least two PUCCHs, comprises:
determining, by the terminal, that the uplink information of the at least two PUCCHs adopts a multiplexing transmission mode if a time domain ending position of the first type of PUCCH is in the back of or the same as a time domain ending position of the second type of PUCCH.

3. The method according to claim 2, wherein the method further comprises:
receiving, by the terminal, first configuration information sent by a network device, wherein the first configuration information is used for determining a candidate PUCCH set, and a time domain ending position of any candidate PUCCH in the candidate PUCCH set is in the front of or the same as the time domain ending position of the first type of PUCCH;
wherein the second type of PUCCH belongs to the candidate PUCCH set.

4. The method according to claim 2, wherein the determining, by a terminal, a transmission mode of uplink information of at least two PUCCHs according to time domain position of the at least two PUCCHs, further comprises:

determining, by the terminal, that only uplink information of the first type of PUCCH in the at least two PUCCHs is transmitted, or determining, by the terminal, that only uplink information of the first type of PUCCH in the at least two PUCCHs is transmitted in the overlapping part if the time domain ending position of the first type of PUCCH is in the front of the time domain ending position of the second type of PUCCH.

5. The method according to claim 1, wherein the at least two PUCCHs comprise a first type of PUCCH and a second type of PUCCH;
the determining, by a terminal, a transmission mode of uplink information of at least two PUCCHs according to time domain position of the at least two PUCCHs, comprises:
determining, by the terminal, that the uplink information of the at least two PUCCHs adopts a multiplexing transmission mode if a time domain ending position of the first type of PUCCH is in the back of or the same as a time domain ending position of a multiplexing channel; wherein the multiplexing channel is used for transmitting the uplink information in the at least two PUCCHs;
wherein the determining, by a terminal, a transmission mode of uplink information of at least two PUCCHs according to time domain position of the at least two PUCCHs, further comprises:
determining, by the terminal, that only uplink information of the first type of PUCCH in the at least two PUCCHs is transmitted, or determining, by the terminal, that only uplink information of the first type of PUCCH in the at least two PUCCHs is transmitted in the overlapping part if the time domain ending position of the first type of PUCCH is in the front of a time domain ending position of a multiplexing channel.

6. The method according to claim 1, wherein the determining, by a terminal, a transmission mode of uplink information of at least two PUCCHs according to processing time of the at least two PUCCHs, comprises:
determining, by the terminal, that the uplink information of the at least two PUCCHs adopts a multiplexing transmission mode if time difference from a starting position of a target PUCCH to a time domain ending position of a target physical downlink shared channel (PDSCH) is greater than or equal to a first time interval;
wherein the first time interval at least comprises a first time, and the first time is processing time of the terminal for PDSCH; the target PUCCH is one of the at least two PUCCHs or a multiplexing PUCCH, and the target PDSCH is one of at least two PDSCHs corresponding to the at least two PUCCHs; wherein the multiplexing PUCCH is used for transmitting the uplink information in the at least two PUCCHs.

7. The method according to claim 6, wherein
the determining, by the terminal, that the uplink information of the at least two PUCCHs adopts a multiplexing transmission mode if time difference from a starting position of a target PUCCH to a time domain ending position of a target PDSCH is greater than or equal to a first time interval, comprises:
determining, by the terminal, that the uplink information of the at least two PUCCHs adopts a multiplexing transmission mode if the time difference from the starting position of target PUCCH to the time domain ending position of target PDSCH is greater than or equal to a first time interval, and time difference from the starting position of the target PUCCH to a time domain ending position of target downlink control information (DCI), is greater than or equal to a second time interval;

wherein the second time interval at least comprises a second time, and the second time is preparation time of the terminal for a physical uplink shared channel (PUSCH); the target DCI is a DCI for scheduling the target PDSCH;

wherein the determining, by a terminal, a transmission mode of uplink information of at least two PUCCHs according to processing time of the at least two PUCCHs, further comprises:

determining, by the terminal, that only uplink information of first type of PUCCH in the at least two PUCCHs is transmitted, or determining, by the terminal, that only the uplink information of the first type of PUCCH in the at least two PUCCHs is transmitted in the overlapping part if the time difference from the starting position of the target PUCCH to the time domain ending position of the target PDSCH is less than the first time interval.

8. The method according to claim 1, wherein a resource of the multiplexing channel is configured by semi-persistent signaling;

wherein the first PDSCH set is configured by semi-persistent signaling.

9. A channel transmission method, wherein the method comprises:

determining, by a network device, a transmission mode of uplink information of at least two physical uplink control channels (PUCCH) according to at least one of time domain position and processing time of the at least two PUCCHs under a condition of determining that resources of the at least two PUCCHs have an overlapping part in time domain, wherein the uplink information comprises an HARQ-ACK feedback;

wherein the at least two PUCCHs at least comprise a first PUCCH and a second PUCCH, uplink information of the first PUCCH is a first feedback codebook, and uplink information of the second PUCCH is a second feedback codebook;

the method further comprises:

receiving, by the network device, the first feedback codebook and the second feedback codebook on a multiplexing channel under a condition of determining that the uplink information of the first PUCCH and the uplink information of the second PUCCH adopt a multiplexing transmission mode;

wherein a resource of the multiplexing channel is determined based on a first indicator in a fourth DCI, and the first indicator is used for indicating the resource of the multiplexing channel;

wherein the first feedback codebook is used for transmitting feedback information corresponding to a first PDSCH set, the second feedback codebook is used for transmitting feedback information corresponding to a second PDSCH set, and priority of the first feedback codebook is higher than priority of the second feedback codebook; the first PDSCH set are scheduled by at least one DCI, and the fourth DCI refers to last DCI in the at least one DCI.

10. The method according to claim 9, wherein the at least two PUCCHs comprise a first type of PUCCH and a second type of PUCCH;

the determining, by a network device, a transmission mode of uplink information of the at least two PUCCHs according to time domain position of the at least two PUCCHs, comprises:

determining, by the network device, that the uplink information of the at least two PUCCHs adopts a multiplexing transmission mode if a time domain ending position of the first type of PUCCH is in the back of or the same as a time domain ending position of the second type of PUCCH.

11. The method according to claim 10, wherein the method further comprises:

sending, by the network device, first configuration information to a terminal, wherein the first configuration information is used for determining a candidate PUCCH set, and a time domain ending position of any candidate PUCCH in the candidate PUCCH set is in the front of or the same as the a time domain ending position of the first type of PUCCH;

wherein the second type of PUCCH belongs to the candidate PUCCH set.

12. The method according to claim 10, wherein the determining, by a network device, a transmission mode of uplink information of the at least two PUCCHs according to time domain position of the at least two PUCCHs, further comprises:

determining, by the network device, that only uplink information of the first type of PUCCH in the at least two PUCCHs is received, or determining, by the network device, that only uplink information of the first type of PUCCH in the at least two PUCCHs is received in the overlapping part if the time domain ending position of the first type of PUCCH is in the front of the time domain ending position of the second type of PUCCH.

13. The method according to claim 9, wherein the at least two PUCCHs comprise a first type of PUCCH and a second type of PUCCH;

the determining, by a network device, a transmission mode of uplink information of the at least two PUCCHs according to time domain position of the at least two PUCCHs, comprises:

determining, by the network device, that the uplink information of the at least two PUCCHs adopts a multiplexing transmission mode if a time domain ending position of the first type of PUCCH is in the back of or the same as a time domain ending position of a multiplexing channel; wherein the multiplexing channel is used for transmitting the uplink information in the at least two PUCCHs;

wherein the determining, by a network device, a transmission mode of uplink information of the at least two PUCCHs according to time domain position of the at least two PUCCHs, further comprises:

determining, by the network device, that only uplink information of the first type of PUCCH in the at least two PUCCHs is received, or determining, by the network device, that only uplink information of the first type of PUCCH in the at least two PUCCHs is received in the overlapping part if the time domain ending position of the first type of PUCCH is in the front of a time domain ending position of the multiplexing channel.

14. The method according to claim 9, wherein the determining, by a network device, a transmission mode of uplink information of the at least two PUCCHs according to processing time of the at least two PUCCHs, comprises:

determining, by the network device, that the uplink information of the at least two PUCCHs adopts a multiplexing transmission mode if time difference from a starting position of a target PUCCH to a time domain ending position of a target physical downlink shared channel (PDSCH) is greater than or equal to a first time interval;

wherein the first time interval at least comprises a first time, and the first time is processing time of a terminal for PDSCH; the target PUCCH is one of the at least two PUCCHs or a multiplexing PUCCH, and the target PDSCH is one of at least two PDSCHs corresponding to the at least two PUCCHs; wherein the multiplexing PUCCH is used for transmitting uplink information in the at least two PUCCHs.

15. The method according to claim 14, wherein
the determining, by the network device, that the uplink information of the at least two PUCCHs adopts a multiplexing transmission mode if time difference from a starting position of a target PUCCH to a time domain ending position of a target PDSCH is greater than or equal to a first time interval, comprises:

determining, by the network device, that the uplink information of the at least two PUCCHs adopts a multiplexing transmission mode if the time difference from the starting position of the target PUCCH to the time domain ending position of the target PDSCH is greater than or equal to a first time interval, and time difference from the starting position of the target PUCCH to the time domain ending position of target downlink control information (DCI) is greater than or equal to a second time interval;

wherein the second time interval at least comprises a second time, and the second time is preparation time of the terminal for a physical uplink shared channel (PUSCH); the target DCI is a DCI for scheduling the target PDSCH;

wherein the determining, by a network device, a transmission mode of uplink information of the at least two PUCCHs according to processing time of the at least two PUCCHs, further comprises:

determining, by the network device, that only uplink information of first type of PUCCH in the at least two PUCCHs is received, or determining, by the network device, that only the uplink information of the first type of PUCCH in the at least two PUCCHs is received in the overlapping part if the time difference from the starting position of the target PUCCH to the time domain ending position of the target PDSCH is less than the first time interval.

16. A channel transmission apparatus applied to a network device programed to execute the method according to claim 9, wherein the apparatus comprises:
at least one processor; and
a memory communicatively connected with the at least one processor; wherein,
the memory stores instructions executable by the at least one processor, and the instructions are executed by the at least one processor, so that the at least one processor is configured to execute said method.

17. The method according to claim 9, wherein a resource of the multiplexing channel is configured by semi-persistent signaling;
wherein the first PDSCH set is configured by semi-persistent signaling.

18. A channel transmission apparatus applied to a terminal, wherein the apparatus comprises:
at least one processor; and
a memory communicatively connected with the at least one processor; wherein,
the memory stores instructions executable by the at least one processor, and the instructions are executed by the at least one processor, so that the at least one processor is configured to:
determine a transmission mode of uplink information of at least two PUCCHs according to at least one of time domain position and processing time of the at least two PUCCHs under a condition of determining that resources of the at least two PUCCHs have an overlapping part in time domain, wherein the uplink information comprises an HARQ-ACK feedback;
wherein the at least two PUCCHs at least comprise a first PUCCH and a second PUCCH, uplink information of the first PUCCH is a first feedback codebook, and uplink information of the second PUCCH is a second feedback codebook;
the at least one processor is further configured to:
transmit the first feedback codebook and the second feedback codebook through a multiplexing channel under a condition of determining that the uplink information of the first PUCCH and the uplink information of the second PUCCH adopt a multiplexing transmission mode;
wherein a resource of the multiplexing channel is determined based on a first indicator in a fourth DCI, and the first indicator is used for indicating the resource of the multiplexing channel;
wherein the first feedback codebook is used for transmitting feedback information corresponding to a first PDSCH set, the second feedback codebook is used for transmitting feedback information corresponding to a second PDSCH set, and priority of the first feedback codebook is higher than priority of the second feedback codebook; the first PDSCH set are scheduled by at least one DCI, and the fourth DCI refers to last DCI in the at least one DCI.

19. The apparatus according to claim 18, wherein the at least two PUCCHs comprise a first type of PUCCH and a second type of PUCCH; the at least one processor is further configured to:
determine that the uplink information of the at least two PUCCHs adopts a multiplexing transmission mode if a time domain ending position of the first type of PUCCH is in the back of or the same as a time domain ending position of the second type of PUCCH.

20. The apparatus according to claim 19, wherein the at least one processor is further configured to:
receive first configuration information sent by a network device, wherein the first configuration information is used for determining a candidate PUCCH set, and a time domain ending position of any candidate PUCCH in the candidate PUCCH set is in the front of or the same as the time domain ending position of the first type of PUCCH;
wherein the second type of PUCCH belongs to the candidate PUCCH set.

* * * * *